United States Patent
Bailey et al.

(10) Patent No.: US 10,749,884 B2
(45) Date of Patent: Aug. 18, 2020

(54) SYSTEMS AND METHODS FOR DETECTING AND PREVENTING SPOOFING

(71) Applicant: MASTERCARD TECHNOLOGIES CANADA ULC, Vancouver (CA)

(72) Inventors: Christopher Everett Bailey, Langley (CA); Randy Lukashuk, Errington (CA); Gary Wayne Richardson, Port Moody (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 16/232,789

(22) Filed: Dec. 26, 2018

(65) Prior Publication Data

US 2019/0149567 A1 May 16, 2019

Related U.S. Application Data

(63) Continuation of application No. 15/256,611, filed on Sep. 4, 2016, now Pat. No. 10,212,180.

(Continued)

(51) Int. Cl.
*H04L 29/06* (2006.01)
*G06F 16/28* (2019.01)
(Continued)

(52) U.S. Cl.
CPC ............ *H04L 63/1425* (2013.01); *G06F 7/08* (2013.01); *G06F 16/2255* (2019.01);
(Continued)

(58) Field of Classification Search
CPC ............. H04L 63/1466; H04L 63/1416; H04L 63/1425; H04L 67/02
See application file for complete search history.

(56) References Cited

U.S. PATENT DOCUMENTS

| | | |
|---|---|---|
| 5,761,652 A | 6/1998 | Wu |
| 5,774,525 A | 6/1998 | Kanevsky et al. |

(Continued)

FOREIGN PATENT DOCUMENTS

| | | |
|---|---|---|
| CA | 2426168 A1 | 5/2002 |
| DE | 102008003531 A1 | 7/2009 |

(Continued)

OTHER PUBLICATIONS

Adverlab Blog Spot, "CAPTCHA Advertising, Part II," Jan. 8, 2007. http://adverlab.blospot.com/2007/01/captcha-advertising-part-ii.html, retrieved on Jul. 24, 2008.

(Continued)

*Primary Examiner* — Ellen Tran
(74) *Attorney, Agent, or Firm* — Michael Best & Friedrich LLP

(57) ABSTRACT

Techniques for ascertaining legitimacy of communications received during a digital interaction with a client device. The techniques include: receiving a communication; identifying from the communication a first secured token; processing the first secured token by: obtaining, from the first secured token, information indicating a state of the digital interaction; and using the information indicating the state to determine whether the communication is from the client device; and when it is determined that the communication is from the client device, causing at least one action responsive to the communication to be performed; updating the information indicating the state of the digital interaction to obtain updated information indicating the state of the digital interaction; and providing a second secured token to the client device for use in a subsequent communication during the digital interaction, the second secured token comprising the updated information indicating the state of the digital interaction.

18 Claims, 13 Drawing Sheets

Related U.S. Application Data

(60) Provisional application No. 62/214,969, filed on Sep. 5, 2015.

(51) Int. Cl.
| | |
|---|---|
| *G06F 16/22* | (2019.01) |
| *G06F 16/9535* | (2019.01) |
| *G06F 16/2457* | (2019.01) |
| *G06F 21/44* | (2013.01) |
| *G06F 21/31* | (2013.01) |
| *G06F 21/32* | (2013.01) |
| *H04L 29/08* | (2006.01) |
| *H04L 12/24* | (2006.01) |
| *G06F 21/60* | (2013.01) |
| *G06F 7/08* | (2006.01) |
| *H04L 12/26* | (2006.01) |
| *G06F 21/55* | (2013.01) |

(52) U.S. Cl.
CPC ...... *G06F 16/24578* (2019.01); *G06F 16/285* (2019.01); *G06F 16/9535* (2019.01); *G06F 21/316* (2013.01); *G06F 21/32* (2013.01); *G06F 21/44* (2013.01); *G06F 21/552* (2013.01); *G06F 21/602* (2013.01); *H04L 41/20* (2013.01); *H04L 43/12* (2013.01); *H04L 43/16* (2013.01); *H04L 63/0861* (2013.01); *H04L 63/1408* (2013.01); *H04L 63/1416* (2013.01); *H04L 63/1466* (2013.01); *H04L 63/20* (2013.01); *H04L 67/02* (2013.01); *H04L 67/22* (2013.01); *H04L 67/30* (2013.01); *H04L 67/303* (2013.01); *G06F 2221/033* (2013.01); *G06F 2221/2101* (2013.01); *G06F 2221/2137* (2013.01); *G06F 2221/2145* (2013.01); *H04L 2463/144* (2013.01)

(56) References Cited

U.S. PATENT DOCUMENTS

| | | |
|---|---|---|
| 5,870,752 A | 2/1999 | Gibbons et al. |
| 5,940,751 A | 8/1999 | Kaplan et al. |
| 6,044,155 A | 3/2000 | Thomlinson et al. |
| 6,829,711 B1 | 12/2004 | Kwok et al. |
| 7,523,016 B2 | 4/2009 | Surdulescu et al. |
| 7,630,924 B1 | 12/2009 | Collins et al. |
| 7,680,891 B1 | 3/2010 | Pongsajapan |
| 7,945,952 B1 | 5/2011 | Behforooz |
| 8,001,597 B2 | 8/2011 | Crooks |
| 8,082,349 B1 | 12/2011 | Bhargava et al. |
| 8,181,253 B1 | 3/2012 | Zaitsev et al. |
| 8,386,393 B2 | 2/2013 | Michelsen et al. |
| 8,510,795 B1 | 8/2013 | Gargi |
| 8,578,500 B2 | 11/2013 | Long |
| 8,880,435 B1 | 11/2014 | Catlett et al. |
| 8,887,286 B2 | 11/2014 | Dupont et al. |
| 8,898,766 B2 | 11/2014 | Garmark et al. |
| 8,997,230 B1 | 3/2015 | McCauley et al. |
| 9,256,715 B2 | 2/2016 | Draluk et al. |
| 9,275,215 B2 | 3/2016 | Bailey |
| 9,378,354 B2 | 6/2016 | Bailey |
| 9,485,118 B1 | 11/2016 | Atlas et al. |
| 9,633,190 B2 | 4/2017 | Bailey |
| 9,648,034 B2 | 5/2017 | Bailey et al. |
| 9,680,868 B2 | 6/2017 | Bailey et al. |
| 9,749,356 B2 | 8/2017 | Bailey et al. |
| 9,749,357 B2 | 8/2017 | Bailey et al. |
| 9,749,358 B2 | 8/2017 | Bailey et al. |
| 9,800,601 B2 | 10/2017 | Bailey et al. |
| 9,813,446 B2 | 11/2017 | Bailey et al. |
| 9,842,204 B2 | 12/2017 | Bailey |
| 9,946,864 B2 | 4/2018 | Bailey |
| 9,979,747 B2 | 5/2018 | Bailey et al. |
| 9,990,487 B1 | 6/2018 | Bailey et al. |
| 10,007,776 B1 | 6/2018 | Bailey et al. |
| 10,127,373 B1 | 11/2018 | Bailey et al. |
| 10,129,279 B2 | 11/2018 | Bailey et al. |
| 2002/0087882 A1 | 7/2002 | Schneier et al. |
| 2002/0090926 A1 | 7/2002 | Pirkola et al. |
| 2003/0101357 A1 | 5/2003 | Rohen et al. |
| 2003/0163431 A1 | 8/2003 | Ginter et al. |
| 2004/0006532 A1 | 1/2004 | Lawrence et al. |
| 2004/0054924 A1 | 3/2004 | Chuah et al. |
| 2004/0254793 A1 | 12/2004 | Herley et al. |
| 2005/0097320 A1 | 5/2005 | Golan et al. |
| 2005/0114705 A1 | 5/2005 | Reshef et al. |
| 2005/0132222 A1* | 6/2005 | Petrovic .............. H04L 9/3213 726/4 |
| 2005/0144067 A1 | 6/2005 | Farahat et al. |
| 2005/0209974 A1 | 9/2005 | Okunseinde |
| 2006/0206941 A1 | 9/2006 | Collins |
| 2006/0212931 A1 | 9/2006 | Shull et al. |
| 2006/0230039 A1 | 10/2006 | Shull et al. |
| 2006/0282660 A1 | 12/2006 | Varghese et al. |
| 2007/0043681 A1 | 2/2007 | Morgan et al. |
| 2007/0124201 A1 | 5/2007 | Hu et al. |
| 2007/0124806 A1 | 5/2007 | Shulman et al. |
| 2007/0140131 A1 | 6/2007 | Malloy et al. |
| 2007/0226053 A1 | 9/2007 | Carl et al. |
| 2007/0239604 A1 | 10/2007 | O'Connell et al. |
| 2008/0010678 A1 | 1/2008 | Burdette et al. |
| 2008/0040285 A1 | 2/2008 | Wakmueller |
| 2008/0114885 A1 | 5/2008 | Kulkarni et al. |
| 2008/0127302 A1 | 5/2008 | Qvarfordt et al. |
| 2008/0133321 A1 | 6/2008 | Pennock et al. |
| 2008/0133347 A1 | 6/2008 | Josifovski et al. |
| 2008/0133348 A1 | 6/2008 | Reed et al. |
| 2008/0140576 A1 | 6/2008 | Lewis et al. |
| 2008/0162338 A1 | 7/2008 | Samuels et al. |
| 2008/0189768 A1 | 8/2008 | Callahan et al. |
| 2008/0250497 A1 | 10/2008 | Mullarkey et al. |
| 2008/0301040 A1 | 12/2008 | Knudson et al. |
| 2009/0012855 A1 | 1/2009 | Jamal et al. |
| 2009/0019182 A1 | 1/2009 | Riise et al. |
| 2009/0113294 A1 | 4/2009 | Sanghavi et al. |
| 2009/0138723 A1 | 5/2009 | Nyang et al. |
| 2009/0249477 A1 | 10/2009 | Punera |
| 2009/0328163 A1 | 12/2009 | Preece |
| 2010/0077482 A1 | 3/2010 | Adams |
| 2010/0280880 A1 | 11/2010 | Faith et al. |
| 2011/0016052 A1 | 1/2011 | Scragg |
| 2011/0016534 A1 | 1/2011 | Jakobsson et al. |
| 2011/0029902 A1 | 2/2011 | Bailey |
| 2011/0047605 A1 | 2/2011 | Sontag et al. |
| 2011/0247071 A1 | 10/2011 | Hooks et al. |
| 2012/0054841 A1 | 3/2012 | Schultz et al. |
| 2012/0096557 A1 | 4/2012 | Britton et al. |
| 2012/0098750 A1 | 4/2012 | Allen et al. |
| 2012/0137367 A1 | 5/2012 | Dupont et al. |
| 2012/0207046 A1 | 8/2012 | Di Pietro et al. |
| 2012/0210429 A1 | 8/2012 | Stute |
| 2012/0310838 A1 | 12/2012 | Harris et al. |
| 2013/0024339 A1 | 1/2013 | Choudhuri et al. |
| 2013/0110761 A1 | 5/2013 | Viswanathan et al. |
| 2013/0205370 A1 | 8/2013 | Kalgi et al. |
| 2013/0239206 A1 | 9/2013 | Draluk et al. |
| 2013/0276125 A1 | 10/2013 | Bailey |
| 2013/0339186 A1 | 12/2013 | French et al. |
| 2013/0339736 A1* | 12/2013 | Nayshtut .............. H04L 63/08 713/170 |
| 2014/0026220 A1* | 1/2014 | Gehrig, Jr. ............ H04L 67/38 726/23 |
| 2014/0229414 A1 | 8/2014 | Goldberg et al. |
| 2014/0282943 A1* | 9/2014 | Nikankin ............ H04L 63/0884 726/6 |
| 2014/0317726 A1 | 10/2014 | Turgeman et al. |
| 2014/0317750 A1 | 10/2014 | Bailey |
| 2014/0317751 A1 | 10/2014 | Bailey |
| 2014/0325657 A1 | 10/2014 | Bailey |
| 2014/0380448 A1 | 12/2014 | Bailey |
| 2015/0033086 A1 | 1/2015 | Sasturkar et al. |
| 2015/0052616 A1 | 2/2015 | Hutchison et al. |

(56) References Cited

U.S. PATENT DOCUMENTS

| | | | |
|---|---|---|---|
| 2015/0106888 A1 | 4/2015 | Cheng et al. | |
| 2015/0135316 A1 | 5/2015 | Took et al. | |
| 2015/0310195 A1 | 10/2015 | Bailor et al. | |
| 2015/0341383 A1* | 11/2015 | Reddy | H04L 63/0245 726/22 |
| 2015/0382084 A1 | 12/2015 | Gallo et al. | |
| 2016/0164912 A1 | 6/2016 | Del Fante | |
| 2016/0180557 A1 | 6/2016 | Yousaf et al. | |
| 2016/0294773 A1 | 10/2016 | Yu et al. | |
| 2016/0359872 A1 | 12/2016 | Yadav et al. | |
| 2017/0070521 A1 | 3/2017 | Bailey et al. | |
| 2017/0070534 A1 | 3/2017 | Bailey et al. | |
| 2017/0339184 A1 | 11/2017 | Bailey et al. | |
| 2018/0101676 A1 | 4/2018 | Bailey | |
| 2018/0189475 A1 | 7/2018 | Bailey | |
| 2018/0191762 A1 | 7/2018 | Bailey et al. | |

FOREIGN PATENT DOCUMENTS

| | | | |
|---|---|---|---|
| EP | 2682892 A1 | 1/2014 | |
| JP | 2008/052727 A | 3/2008 | |
| KR | 1020100098241 A | 9/2010 | |
| WO | WO 2001/080525 A1 | 10/2001 | |
| WO | WO 2005/119648 A2 | 12/2005 | |
| WO | WO 2007/136665 A2 | 11/2007 | |
| WO | WO 2008/025019 A1 | 2/2008 | |
| WO | WO 2008/027642 A2 | 3/2008 | |
| WO | WO 2009/122302 A2 | 10/2009 | |

OTHER PUBLICATIONS

Adverlab Blog Spot, "CAPTCHA Advertising," Oct. 27, 2005. http://www.adverlab.blogspot.com/2005/10/captcha-advertising.html, retrieved on Jul. 24, 2008.

Athanasopoulos et al. "Enhanced CAPTCHAs: Using Animation to Tell Humans and Computers Apart," H. Leitol and E. Markatos (Eds): CMS 2006, LNCS 4237, pp. 97-108, 2006. IFIP international Federation for Information Processing 2006.

Chemane et al., MCDM model for selecting Internet access technologies—A case study in Mozambique. Proceedings of the International Conference on Computer as a Tool. EUR OCON 2005, Belgrade, Serbia & Montenegro, Nov. 22-24, 2005. pp. 1738-1741, Nov. 22, 2005.

Delfigo Corporation. "DSGateway: Context-Based Identity Assurance," Copyright 2009. http://www.delfigosecurity.com/products, retrieved on Mar. 11, 2009.

Fischer, I. et al. "Visual CAPTCHAs for Document Authentication," 2006 IEEE 8th Workshop on Multimedia Signal Processing, MMSP '06, Victoria, Canada, Oct. 1, 2006, pp. 471-474.

Fusco et al., "NET-Fli: On-the-fly Compression, Archiving and Indexing of Streaming Network Traffic". Proceedings of the Proceedings of the Very Large Database(VLDB) Endowment. 2010;3(1-2):1382-93.

Giasson, "Expand your ad network with an interactive video ad unit that generates unprecedented user engagement—and protects websites and services from hackers." Leap Marketing NuCaptcha Concept Videos. Leap Marketing Technologies. Available at http://microsoft.leapmaketing.com/. Last accessed Feb. 23, 2009. 3 pages.

Godin, S., Seth's Blog, "Commercializing Captcha," Dec. 1, 2006. http://sethgodin.typepad.com/seths_blog/2006/12/commercializing.html, retrived on May 17, 2012.

International Preliminary Report on Patentability for International Application No. PCT/CA2014/050229 dated Sep. 24, 2015.

International Preliminary Report on Patentability for International Application No. PCT/IB2009/005645 dated Oct. 14, 2010.

International Search Report and Written Opinion for International Application No. PCT/CA2014/050229 dated Jun. 17, 2014.

International Search Report and Written Opinion for International Application No. PCT/IB2009/005645 dated Nov. 20, 2009.

International Search Report and Written Opinion for International Application No. PCT/IB2016/001957 dated Jun. 13, 2017.

International Search Report and Written Opinion for International Application No. PCT/IB2016/001413 dated Jan. 25, 2017.

International Search Report and Written Opinion for International Application No. PCT/IB2016/001454 dated Feb. 23, 2017.

International Preliminary Report on Patentability for International Application No. PCT/IB2016/001454 dated Mar. 15, 2018.

Invitation to Pay Additional Fees for International Application No. PCT/IB2009/005645 dated Sep. 2, 2009.

Joseph Herndon, *FairWarning IP, LLC v. Iatric Systems, Inc.* (Fed. Cir. 2016), Oct. 13, 2016, Patent Docs, pp. 1-3.

JY's Weblog, "Ads in Captchas," May 1, 2007. http://jy.typepad.com/jy/2007/01/ads_in_captchas.html.

Kearns, D., "Start-up Measures Users' Trustworthiness for Authentication into Sites," Network World, Jan. 21, 2009. http://www.networkworld.com/newsletters/dir/2009/011909id2.html, retrieved on Mar. 11, 2009.

Kompella et al., On Scalable Attack Detection in the Network. IEEE/ACM Transactions on Networking 2007;15(1):14-25.

Liao, W.-H., et al. "Embedding Information within Dynamic Visual Patterns," 2004 IEEE International Conference on Multimedia and Expo: Jun. 27-30, 2004, Taipei, Taiwan, IEEE Operations Center, Piscataway, NJ, vol. 2, Jun. 27, 2004, pp. 895-898.

Naone, E., Technology Review, "The Captcha Arms Race," Mar./Apr. 2009.

Schultz, "Reputation scoring changes the enterprise security game." ComputerWorld. Apr. 3, 2009. 3 pages.

Teleport Jobs Webmaster Tools, "Free CAPTCHA," Copyright 2004-2007. http://www.teleportjobs.com/captcha.asp, retrieved on Jul. 24, 2008.

Yen et al., "Traffic Aggregation for Malware Detection." Proceedings of the 5th International Conference on Detection of Intrusions and Malware, and Vulnerability Assessment. DIMVA. 2008:207-27.

Office Action for U.S. Appl. No. 15/411,805 dated Feb. 23, 2017.

Office Action for U.S. Appl. No. 15/411,805 dated Mar. 2, 2017.

Office Action for U.S. Appl. No. 15/411,805 dated May 22, 2017.

Office Action for U.S. Appl. No. 15/411,805 dated Jun. 16, 2017.

Office Action for U.S. Appl. No. 15/411,805 dated Jun. 23, 2017.

Office Action for U.S. Appl. No. 15/617,542 dated Mar. 19, 2018.

Office Action for U.S. Appl. No. 15/617,542 dated Oct. 15, 2018.

Australian Patent Office Examination Report No. 1 for Standard Patent Application No. 2016334816 dated Sep. 19, 2018 (5 pages).

Canadian Patent Office Action for Application No. 2,997,585 dated Nov. 30, 2018 (4 pages).

Canadian Patent Office Action for Application No. 2,997,583 dated Jan. 16, 2019 (4 pages).

Canadian Patent Office Action for Application No. 2,997,597 dated Jan. 17, 2019 (3 pages).

European Extended Search Report for Application No. EP 18168881.3, dated Jul. 2, 2018.

European Extended Search Report from European Patent Application EP 09727261.1 dated Mar. 7, 2012.

European Extended Search Report from European Patent Application EP 14765198.8 dated Sep. 13, 2016.

European Patent Office Partial Supplementary Search Report for Application No. 16853157.2 dated Apr. 4, 2019 (13 pages).

Singapore Patent Office Search Report and Written Opinion for Application No. 11201801710X dated May 13, 2019 (11 pages).

Singapore Patent Office Search Report and Written Opinion for Application No. 11201801718Q dated May 9, 2019 (9 pages).

Office Action for U.S. Appl. No. 15/617,542 dated May 2, 2019 (6 pages).

Australian Patent Office Examination Report No. 2016314061 dated Feb. 18, 2019 (3 pages).

Australian Patent Office Examination Report No. 1 for Application No. 2016315900 dated Jan. 17, 2019 (3 pages).

Australian Patent Office Examination Report No. 2 for Application No. 2016315900 dated Apr. 26, 2019 (3 pages).

Singapore Patent Office Search Report and Written Opinion for Application No. 11201801736X dated May 9, 2019 (10 pages).

United States Patent Office Action for U.S. Appl. No. 15/617,542 dated Oct. 31, 2019 (9 pages).

(56) References Cited

OTHER PUBLICATIONS

Israel Patent Office Action for Application No. 257852 dated Dec. 22, 2019 (8 pages, English translation included).
Israel Patent Office Action for Application No. 257844 dated Dec. 4, 2019 (6 pages, English translation included).
Israel Patent Office Action for Application No. 257849 dated Dec. 5, 2019 (6 pages, English translation included).
Canadian Patent Office Action for Application No. 2,997,597 dated Oct. 16, 2019 (5 pages).
European Patent Office Extended Search Report for Application No. 16853157.2 dated Jul. 15, 2019 (10 pages).
European Patent Office Partial Supplementary Search Report for Application No. 16840899.5 dated Jun. 21, 2019 (6 pages).
United States Patent Office Notice of Allowance for U.S. Appl. No. 15/617,542 dated Jul. 25, 2019 (6 pages).
Canadian Patent Office Action for Application No. 2,997,585 dated Sep. 26, 2019 (5 pages).
Canadian Patent Office Action for Application No. 2,997,583 dated Sep. 5, 2019 (4 pages).
European Patent Office Extended Search Report for Application No. 16840901.9 dated Jul. 26, 2019 (12 pages).
United States Patent Office Action for U.S. Appl. No. 15/908,228 dated Feb. 28, 2020 (15 pages).
United States Patent Office Notice of Allowance for U.S. Appl. No. 15/617,542 dated Mar. 13, 2020 (5 pages).
United States Patent Office Notice of Allowance for U.S. Appl. No. 15/908,228 dated Jun. 12, 2020 (8 pages).

\* cited by examiner

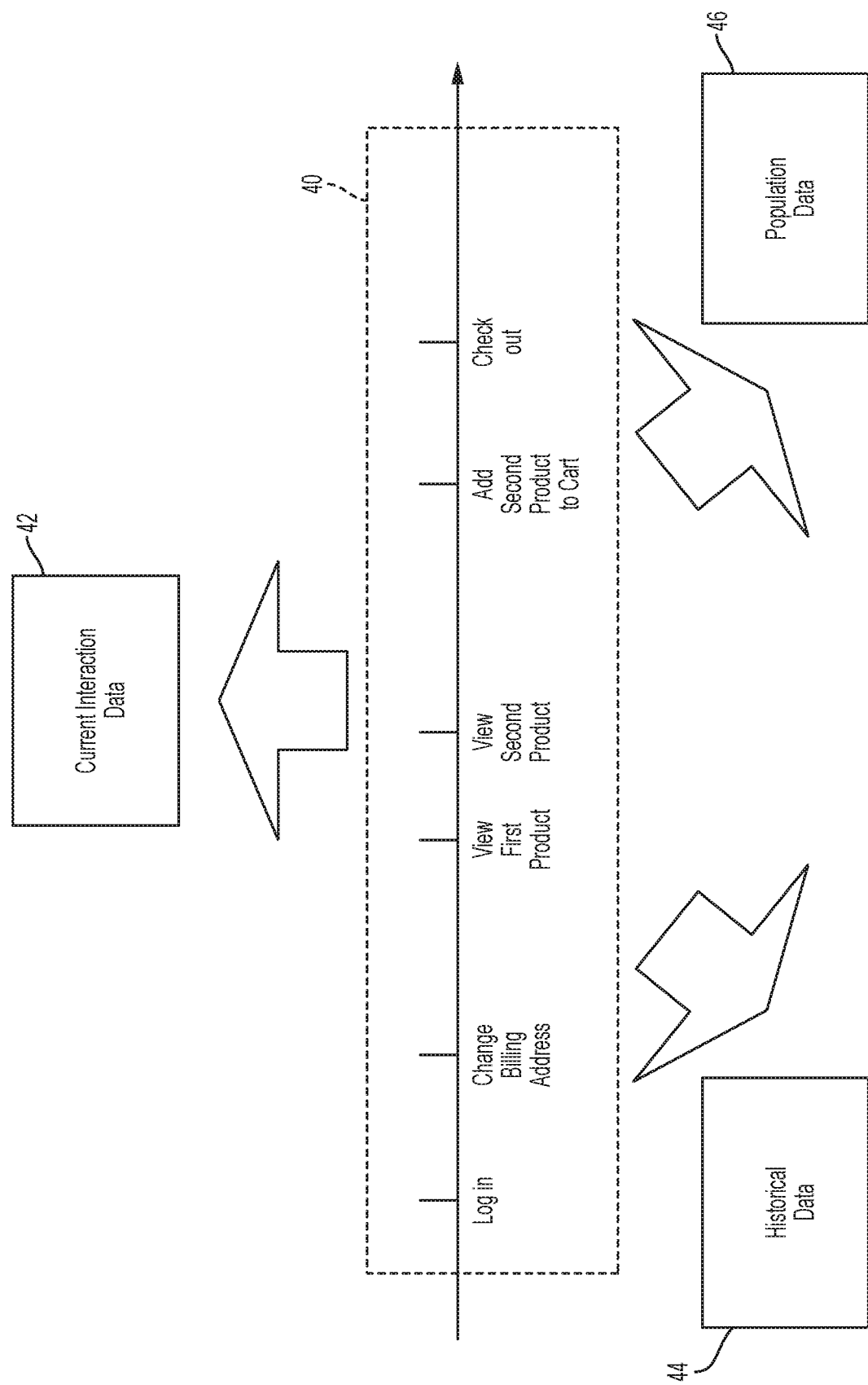

| Input Parameters | ID | Source Data Type | Description |
|---|---|---|---|
| Source Data | sd | Integer | The Initial value for the cumulative calculation. |
| Num Iterations | ni | Integer (1-32) | The number of iterations. |
| Function Name | fn | String | The name of function in the device execution context (JavaScript in the case of a web browser) |

FIG. 6A

| Output Results | ID | Source Data Type | Description |
|---|---|---|---|
| Start Time MS | st | Integer | A Unix style microtime captured from the device JavaScript immediately before the calculation started. |
| Result Data | sd | Integer | The result of the cumulative calculation. |
| End Time MS | et | Integer | A Unix style microtime captured from the device JavaScript immediately after the calculation has finished. |

FIG. 6B

```
# Perform an N-squared calculation
SOURCEDATA = 27
NUMITERATIONS = 5
FUNCTIONNAME = F BEGIN FUNCTION F(SOURCEDATA, ITERATIONS)
 I = 0
 FOREACH( I in ITERATIONS)
   FOREACH( J in ITERATIONS)
     FOREACH( K in 1000 )
         I = I + 1
         R = SQUAREROOT(INTMAX-I)
         IF( SOURCEDATA > R ) # prevent overflow
             SOURCEDATA = R
         SOURCEDATA *= SOURCEDATA
 RETURN SOURCEDATA
END FUNCTION F RESULT = NEW ARRAY[]
RESULT += MICROTIME() # Add start time
RESULT += FUNCTIONNAME(SOURCEDATA, NUMITERATIONS) # Add result
RESULT += ENDTIME = MICROTIME() # Add end time
```

FIG. 6C

| Input Parameters | ID | Source Data Type | Description |
|---|---|---|---|
| Source Data | sd | Integer | The initial seed for the parallel calculation. |
| Num Interations | ni | Integer (1-32) | The number of iterations. |
| Num Threads | nt | Integer (1-32) | The number of parallel executions. |

FIG. 7A

| Output Results | ID | Source Data Type | Description |
|---|---|---|---|
| Start Time MS | st | Integer Array | A Unix style microtime captured from the device JavaScript immediately before the calculation started for each of the parallel executions. |
| Result Data | sd | Integer Array | The results for each of the calculations. |
| End Time MS | et | Integer Array | A Unix style microtime captured from the device JavaScript immediately, after the calculation has finished, for each of the parallel executions. |

FIG. 7B

```
# Perform an N-squared calculation
SOURCEDATA = 27
NUMITERATIONS = 5
FUNCTIONNAME = F BEGIN FUNCTION F(SOURCEDATA, ITERATIONS)
 STARTTIME = MICROTIME()
 I = 0
 FOREACH( I in ITERATIONS)
  FOREACH( J in ITERATIONS)
    FOREACH( K in 1000 )
        I = I + 1
        R = SQUAREROOT(INTMAX-I)
        IF( SOURCEDATA > R ) # prevent overflow
            SOURCEDATA = R
        SOURCEDATA *= SOURCEDATA
 ENDTIME = MICROTIME()
 RETURN NEW ARRAY[] (STARTTIME, SOURCEDATA, ENDTIME)
END FUNCTION F
NUMTHREADS = 8
WORKERS = NEW ARRAY[]
FOREACH( T in NUMTHREADS )
    W = NEW WORKER(F)
    W.STARTWORK()
    WORKERS[] = W RESULTDATA = NEW ARRAY[]
FOREACH( W in WORKERS )
    RESULTDATA += W.GETWORKRESULT()

RESULT += MICROTIME() # Add start time
RESULT += FUNCTIONNAME(SOURCEDATA, NUMITERATIONS) # Add result
RESULT += ENDTIME = MICROTIME() # Add end time
```

FIG. 7C

| Input Parameters | ID | Source Data Type | Description |
|---|---|---|---|
| Source Data | sd | Image Data | MLP input data. Custom encoded in the pixels of a PNG image. Including embedded timestamp |
| Initial Value | iv | Integer | 32-bit initial value for MLP |

FIG. 8A

| Output Results | ID | Source Data Type | Description |
|---|---|---|---|
| Start Time Ms | st | Integer | A Unix style microtime captured from the device JavaScript immediately, before the calculation started, for each of the parallel executions. |
| Result Data | sd | Integer | The MLP initial value XOR'd with the MLP result (hidden value) and the initial, embedded timestamp. |
| End Time Ms | et | Integer | A Unix style microtime captured from the device JavaScript immediately, after the calculation has finished, for each of the parallel executions |

FIG. 8B

SYSTEMS AND METHODS FOR DETECTING AND PREVENTING SPOOFING

CROSS REFERENCE TO RELATED APPLICATIONS

This application is a continuation of U.S. patent application Ser. No. 15/256,611, filed Sep. 4, 2016, which claims the benefit of U.S. Provisional Patent Application No. 62/214,969, filed on Sep. 5, 2015, the entire contents of both of which are hereby incorporated by reference in their entirety.

This application was filed on the same day as U.S. patent application Ser. No. 15/256,612, now granted as U.S. Pat. No. 9,813,446, entitled "SYSTEMS AND METHODS FOR MATCHING AND SCORING SAMENESS," and U.S. patent application Ser. No. 15/256,597, now published as U.S. Patent Application Publication No. 2017/0070521, entitled "SYSTEMS AND METHODS FOR DETECTING AND SCORING ANOMALIES." The entire contents of each of these applications is hereby incorporated by reference in their entirety.

BACKGROUND

A large organization with an online presence often receives tens of thousands requests per minute to initiate digital interactions. A security system supporting multiple large organizations may handle millions of digital interactions at the same time, and the total number of digital interactions analyzed by the security system each week may easily exceed one billion.

As organizations increasingly demand real time results, a security system may have to analyze a large amount of data and accurately determine whether a digital interaction is legitimate, all within fractions of a second. This presents tremendous technical challenges, especially given the large overall volume of digital interactions handled by the security system.

SUMMARY

Some embodiments provide for a method, performed by at least one computer, the method comprising: receiving a communication from an application program executing on a client device different from the at least one computer; identifying from the communication an asserted identity of the application program; and verifying the asserted identity of the application program at least in part by: interacting with the client device to obtain additional information about the application program; and determining whether the additional information about the application program is consistent with the asserted identity of the application program.

Some embodiments provide for a system, comprising: at least one computer; at least one non-transitory computer-readable storage medium storing processor-executable instructions that, when executed by the at least one computer, causes the at least one computer to perform: receiving a communication from an application program executing on a client device different from the at least one computer; identifying from the received communication an asserted identity of the application program; and verifying the asserted identity of the application program at least in part by: interacting with the client device to obtain additional information about the application program; and determining whether the additional information about the application program is consistent with the asserted identity of the application program.

Some embodiments provide for at least one non-transitory computer-readable storage medium storing processor-executable instructions that, when executed by at least one computer, causes the at least one computer to perform: receiving a communication from an application program executing on a client device different from the at least one computer; identifying from the received communication an asserted identity of the application program; and verifying the asserted identity of the application program at least in part by: interacting with the client device to obtain additional information about the application program; and determining whether the additional information about the application program is consistent with the asserted identity of the application program.

Some embodiments provide for a method, performed by at least one computer, the method comprising: receiving a communication from a client device different from the at least one computer; identifying from the communication an asserted type of the client device; and verifying the asserted type of the client device at least in part by: interacting with the client device to obtain additional information about the client device; and determining whether the additional information about the client device is consistent with the asserted type of the client device.

Some embodiments provide for a system, comprising: at least one computer; at least one non-transitory computer-readable medium storing processor-executable instructions that, when executed by the at least one computer, cause the at least one computer to perform: receiving a communication from a client device different from the at least one computer; identifying from the communication an asserted type of the client device; and verifying the asserted type of the client device at least in part by: interacting with the client device to obtain additional information about the client device; and determining whether the additional information about the client device is consistent with the asserted type of the client device.

Some embodiments provide for at least one non-transitory computer-readable medium storing processor-executable instructions that, when executed by at least one computer, cause the at least one computer to perform: receiving a communication from a client device different from the at least one computer; identifying from the communication an asserted type of the client device; and verifying the asserted type of the client device at least in part by: interacting with the client device to obtain additional information about the client device; and determining whether the additional information about the client device is consistent with the asserted type of the client device.

Some embodiments provide for a method, performed by at least one computer, for ascertaining legitimacy of communications received by the at least one computer during a digital interaction between the at least one computer and a client device, the method comprising: receiving a communication; identifying from the communication a first secured token; processing the first secured token by: obtaining, from the first secured token, information indicating a state of the digital interaction; and using the information indicating the state of the digital interaction to determine whether the communication is from the client device; and when it is determined that the communication is from the client device, causing at least one action responsive to the communication to be performed; updating the information indicating the state of the digital interaction to obtain updated information indicating the state of the digital interaction; and providing a second secured token to the client device for use in a subsequent communication during the digital interaction, the second secured token comprising the updated information indicating the state of the digital interaction.

Some embodiments provide for a system for ascertaining legitimacy of communications received by the at least one computer during a communication digital interaction between at least one computer and a client device, the system comprising: the at least one computer; and at least one non-transitory computer-readable storage medium that storing processor-executable instructions that, when executed by the at least one computer, cause the at least one computer to perform: receiving a communication; identifying from the communication a first secured token; processing the first secured token by: obtaining, from the first secured token, information indicating a state of the digital interaction; and using the information indicating the state of the digital interaction to determine whether the communication is from the client device; and when it is determined that the communication is from the client device, causing at least one action responsive to the communication to be performed; updating the information indicating the state of the digital interaction to obtain updated information indicating the state of the digital interaction; and providing a second secured token to the client device for use in a subsequent communication during the digital interaction, the second secured token comprising the updated information indicating the state of the digital interaction.

Some embodiments provide for at least one non-transitory computer-readable storage medium that storing processor-executable instructions that, when executed by at least one computer, cause the at least one computer to perform a method for ascertaining legitimacy of communications received by the at least one computer during a communication digital interaction between at least one computer and a client device, the method comprising: receiving a communication; identifying from the communication a first secured token; processing the first secured token by: obtaining, from the first secured token, information indicating a state of the digital interaction; and using the information indicating the state of the digital interaction to determine whether the communication is from the client device; and when it is determined that the communication is from the client device, causing at least one action responsive to the communication to be performed; updating the information indicating the state of the digital interaction to obtain updated information indicating the state of the digital interaction; and providing a second secured token to the client device for use in a subsequent communication during the digital interaction, the second secured token comprising the updated information indicating the state of the digital interaction.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale.

FIG. 1C shows an illustrative flow 40 within a digital interaction, in accordance with some embodiments of the technology described herein.

FIG. 6A shows illustrative input parameters of a serial cumulative calculation challenge used as part of a technique for detecting device type spoofing, in accordance with some embodiments of the technology described herein.

FIG. 6B shows illustrative output results of a serial cumulative calculation challenge used as part of a technique for detecting device type spoofing, in accordance with some embodiments of the technology described herein.

FIG. 6C shows an illustrative calculation to be performed as part of a serial cumulative calculation challenge used as part of a technique for detecting device type spoofing, in accordance with some embodiments of the technology described herein.

FIG. 7A shows illustrative input parameters of a parallel checkpoints calculation challenge used as part of a technique for detecting device type spoofing, in accordance with some embodiments of the technology described herein.

FIG. 7B shows illustrative output results of a parallel checkpoints calculation challenge used as part of a technique for detecting device type spoofing, in accordance with some embodiments of the technology described herein.

FIG. 7C shows an illustrative calculation to be performed as part of a parallel checkpoints calculation challenge used as part of a technique for detecting device type spoofing, in accordance with some embodiments of the technology described herein.

FIG. 8A shows illustrative input parameters of a neural network calculation challenge used as part of a technique for detecting device type spoofing, in accordance with some embodiments of the technology described herein.

FIG. 8B shows illustrative output results of a neural network calculation challenge used as part of a technique for detecting device type spoofing, in accordance with some embodiments of the technology described herein.

DETAILED DESCRIPTION

Figure 1A:
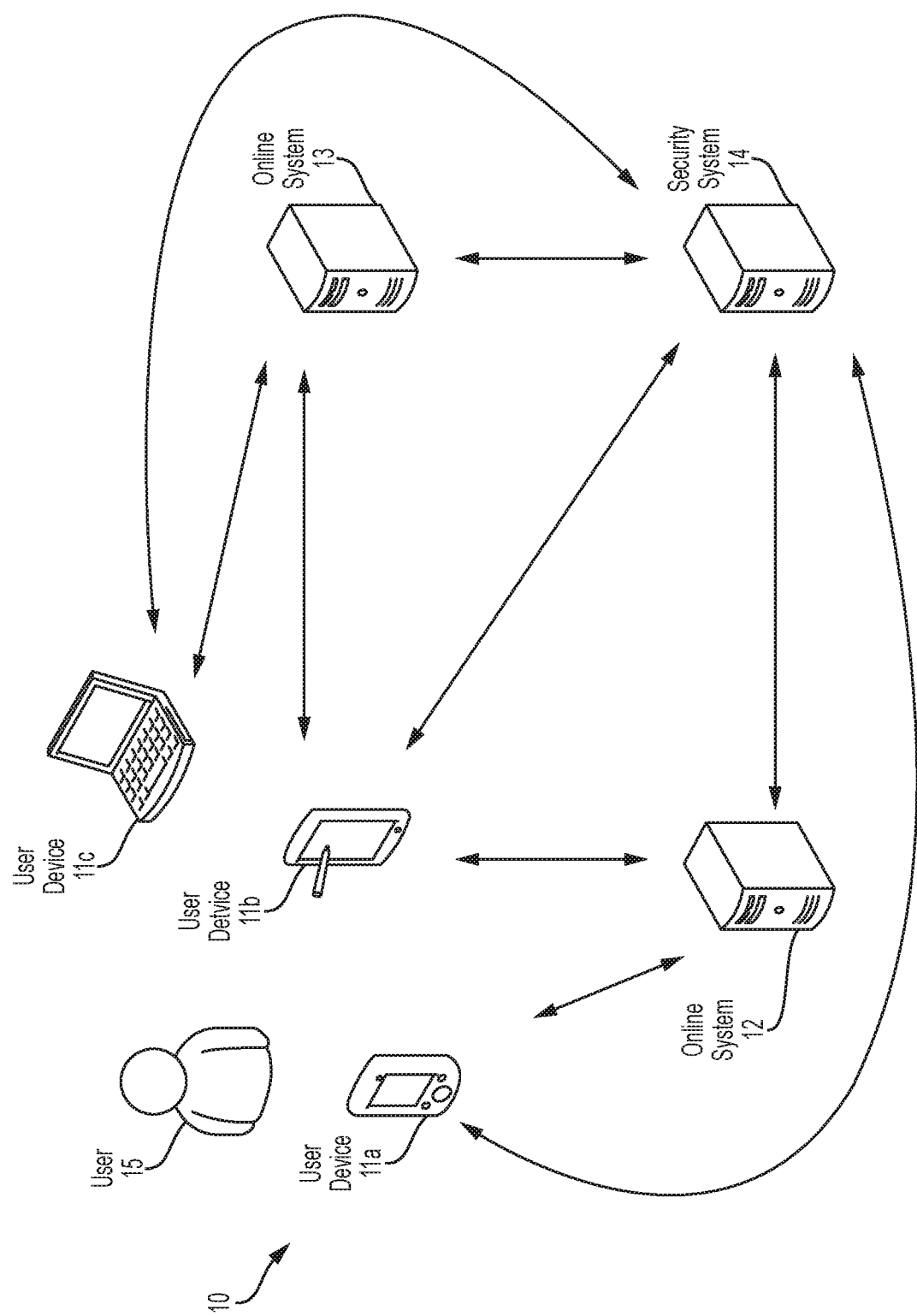
FIG. 1A shows an illustrative system 10 via which digital interactions may take place, in accordance with some embodiments of the technology described herein.

The inventors have recognized and appreciated various technical challenges to overcome sophisticated attacks on online systems. Increasingly, such systems are experiencing more sophisticated attacks and very technical exploits. This presents tremendous technical challenges, especially given the large overall volume of digital interactions handled by online systems.

The inventors have recognized and appreciated various technical challenges in building trust between an online system and a user who interacts with the online system over time. Unlike a store clerk who sees a customer in person and remembers what the customer looks like and how the customer behaves, an online system may have limited ways to "see" or "remember" a user. For example, after the user logs in successfully for the first time from a device, the online system may store a device identifier extracted from data packets received from the device, and may associate the device identifier with the user's account. When a new attempt to log into the account is detected, the online system may check whether a device identifier extracted from newly received data packets match any stored identifier associated with the account. However, this method may not always be effective because a device identifier may be spoofed.

The inventors have appreciated that malicious entities may attempt to spoof legitimate users in one or more ways, including by spoofing a device identifier, in an effort to gain unauthorized access to resources, launch attacks, and/or perform other harmful acts. For example, a malicious entity (e.g., a hacker, fraudster, prankster, etc.) may send a communication to a server in an effort to gain access to a resource accessible through the server, for example a webpage or a service, and may include false information in the communication so that the server interprets the communication as originating from a legitimate user. As one example, a malicious entity may misrepresent the identity of an application program requesting access to a resource (e.g., by asserting in the communication that the application program is a web browser when, in fact, the requesting program is an automated bot part of a botnet used to launch a distributed attack on the server). As another example, a malicious entity may misrepresent the type of the device executing the application program requesting access to the resource (e.g., by asserting in the communication that the device is a mobile device when, in fact, the device from which the request originates is a powerful modern desktop computer). As yet another example, a malicious entity may capture a session token intended for a legitimate user and use the intercepted token to make requests that appear to be coming from the legitimate user. Accordingly, some embodiments of the technology described herein provide techniques for detecting such fraudulent behavior including, but not limited to, application program identity spoofing, device type spoofing, and session token spoofing.

I. Detecting Application Program Spoofing

The inventors have recognized and appreciated that malicious entities may engage in application program spoofing by misrepresenting, in one or more communications sent to a server or other computing device, the identity of the application program sending the communication.

One illustrative example of such application program spoofing arises in the context of accessing web pages. When a user accesses a web page through a web browser, the web browser may send a communication to a server hosting the web page, which communication includes a hypertext transfer protocol (HTTP) request for the web page. The request may contain information such as the type of the web browser making the request (e.g., Internet Explorer, Google Chrome, Safari, Opera, etc.), the version of the browser, capabilities of the browser, and this information may be used by the server to select content that is compatible with the web browser making the request. The following is an illustrative example of an HTTP request that may be sent by a Google Chrome browser:

GET/HTTP/1.1
Host: google.com
Accept: application/json, text/javascript, */*; q=0.01
Accept-Encoding: gzip,deflate,sdch
Accept-Language: en-US,en;q=0.8
User-Agent: Mozilla/5.0 (Macintosh; Intel Mac OS X 10_9_2) AppleWebKit/537.36
(KHTML, like Gecko) Chrome/36.0.1985.125 Safari/537.36

In this example, the HTTP request informs the server, among other things, that the operating system is Mac OS X 10.9.2 and the Chrome browser version is 36.0.1985.125. The server may use this information to provide content optimized for the indicated environment. Additionally, the server may infer that the request is initiated by a person via a web browser running on a computer.

In some instances, a malicious entity may attempt to access a web page using a script or alternative application program instead of a web browser. If the malicious entity does nothing to hide what it is doing, the HTTP request provided by the script or alternative application program would be different from an HTTP request provided by a web browser because it would not indicate that a web browser is making the request. Instead, the User-Agent field may indicate that the application program making the request is a bot (e.g., User-Agent: Bot/1.1). Because a server may deny requests coming from a script or alternative application program (e.g., by denying requests not from a web browser), a malicious entity may place false information in the User-Agent field of the HTTP request to make it appear, to the server, as though the request is originating from a web browser when, in fact, it is not. More generally than the web-browser example, a malicious entity may falsely identify application programs in communications to other devices.

The inventors have recognized and appreciated that it may be difficult to detect counterfeit information in communications (e.g., HTTP requests, HTTPS requests, UDP requests, requests in any other suitable protocol, etc.) because many Internet protocols (e.g., HTTP, HTTPS, UDP, etc.) assume that the sender of a communication will pass accurate information and do not provide a mechanism for verifying the information in the communication. As a result, a malicious requester can provide any information to the server, including values that misrepresent the actual application program (e.g., user agent) making the request.

Accordingly, some embodiments provide techniques for verifying asserted identities of application programs in communications. The techniques may be used for verifying the asserted identities of application programs making HTTP requests and in other situations. In some embodiments, the techniques may involve obtaining additional information from the requester to verify the accuracy of the information provided in a request, as described in more detail below.

In some embodiments, at least one computer may receive a communication from an application program executing on a client device different from the computer and identify, from the communication, an asserted identity of the application program. In response to identifying the asserted identity of the application program, the at least one computer may verify the asserted identity of the application program at least in part by: (1) interacting with the client device to obtain additional information about the application program; and (2) determining whether the additional information about the application program is consistent with the asserted identity of the application program. In some embodiments, the communication may be an HTTP request and the asserted identity of the application program may be the identity of the application program identified in the User Agent field of the HTTP request.

In some embodiments, the at least one computer may include a security system configured to detect spoofing in accordance with some embodiments of the technology described herein. Additionally, or alternatively, the at least one computer may include a server or other device to which the communication was originally directed (e.g., a web server hosting a web page that the communication requested to access). In embodiments where the at least one computer includes both a security system and a server (or other device) to which the communication was originally directed, the server (or other device) may forward at least a part of the communication (e.g., the entire communication) received from the client device to the security system such that the security system may verify the application program identity asserted in the communication by interacting with the requesting client device.

In some embodiments, the at least one computer may verify the asserted identity of the application program in real time, for example, by performing the verification using information obtained in response to (and therefore after) receiving the communication, as opposed to using information obtained prior to receiving the communication.

In some embodiments, interacting with the client device includes: (1) providing, to the client device, a software program that, when executed by the client device, collects the additional information about the application program; (2) receiving, from the client device, the additional information; and (3) using the additional information to verify the asserted identity of the application program. The software program may be a JavaScript program or may be written in any other suitable programming language(s).

In some embodiments, the software program, when executed by the client device, may be configured to collect information about at least one capability of the application program and send this information to a security system which can compare the collected information about the at least one capability of the application program with information about the same capability or capabilities of application programs having the asserted identity. For example, the software program, when executed by the client device, may be configured to determine whether the application program is able to recognize an object that application programs having the asserted identity are able to recognize. As one specific example, if an HTTP request were to identify the requesting program as a particular browser (e.g., Opera, Internet Explorer, etc.), the software program may be configured to determine whether the requesting program recognizes an object that the particular browser is known to be able to recognize (respectively, window.opera, window.ActiveXObject, etc.).

II. Detecting Device Type Spoofing

The inventors have recognized and appreciated that malicious entities may engage in device type spoofing by misrepresenting, in one or more communications sent to a server or other computing device, the type of the device sending the communication. For example, a malicious entity may falsely state, in an HTTP request sent to a server, the type of the device that sent the request.

Accordingly, some embodiments described herein provide for techniques that may be used to verify whether a device sending a communication is indeed of the type indicated in the communication. In some embodiments, the techniques may involve obtaining additional information about one or more execution characteristics of the device that sent the communication and comparing the additional information against a plurality of execution profiles to verify whether the device is of the purported type.

The inventors have recognized and appreciated that devices of a certain type may have a known hardware configuration, and that hardware may be capable of performing operations at different speeds compared to hardware associated with another device type. For example, the hardware in a modern desktop may be substantially more powerful than the hardware in a mobile phone, and therefore may be able to perform operations much more quickly than a mobile phone. Thus, if a communication sent by a device, such as an HTTP request, identifies the device as a mobile phone, but the device's performance in completing one or more computational challenges matches that of a typical desktop computer, it may be determined with a high level of confidence that the device type is being spoofed.

In some embodiments, techniques are provided for making fine-grained distinctions between different types of hardware, for instance, beyond simply distinguishing mobile phones from desktop computers. For example, a first generation iPhone may have a 412 MHz ARM 11 processor, and an iPhone 5s may have a Dual-core 1.3 GHz Cyclone (ARM v8-based) processor. Both types of processors may be able to solve a computational challenge, but may do so in different manners. For instance, given a particular operation type (e.g., addition, subtraction, division, multiplication, modular arithmetic operation, etc.), different types of processor may perform an operation of that type at different speeds. Thus, each operation type may provide a separate dimension for distinguishing between different types of processors.

Accordingly, some embodiments provide for sending one or multiple computational challenges to a device, in response to receiving a (directly or indirectly) communication from the device indicating a purported device type, determining the amount of time taken by the device to perform the computational challenge(s), and determining whether the amount of time taken by the device is consistent with how long it takes devices of the purported type to perform the same computational challenge(s).

In some embodiments, at least one computer may receive a communication from an application program executing on a client device different from the computer and identify, from the communication, an asserted type of the client device. In response to identifying the asserted type of the client device, the at least one computer may verify the asserted type of the client device at least in part by: (1) interacting with the client device to obtain additional information about the client device; and (2) determining whether the additional information about the client device is consistent with the asserted type of the client device. In some embodiments, the communication may be an HTTP request and the asserted type of the client may be the type of the client device stated in the HTTP request.

In some embodiments, the at least one computer may include a security system configured to detect spoofing in accordance with some embodiments of the technology described herein. Additionally, or alternatively, the at least one computer may include a server or other device to which the communication was originally directed (e.g., a web server hosting a web page that the communication requested to access). In embodiments where the at least one computer includes both a security system and a server (or other device) to which the communication was originally directed, the server (or other device) may forward at least a part of the communication (e.g., the entire communication) received from the client device to the security system such that the security system may verify the device type asserted in the communication by interacting with the requesting client device.

In some embodiments, the at least one computer may verify the asserted device type of the client device in real time, for example, by performing the verification using information obtained in response to (and, therefore, after) receiving the communication, as opposed to using information obtained prior to receiving the communication.

In some embodiments, interacting with the client device to obtain additional information includes interacting with the client device to measure an amount of time it takes the client device to perform a task. The additional information may be used to determine whether the amount of time it took the client device to perform the task is consistent with how long it takes client devices having the asserted type to perform the same task.

In some embodiments, determining whether the amount of time it took the client device to perform the task is consistent with how long it takes client devices having the asserted type to perform the task includes accessing information indicating a range of expected execution times, associated with the task, for a population of client devices having the asserted type, and comparing the measured amount of time with the range of expected execution times. For example, when the communication indicates that the client device is asserted to be a mobile device of a certain type, determining whether the asserted type of the client device is consistent with the additional information about the client device may involve determining whether the amount of time it took the client device to perform the task is consistent with how long it takes mobile devices of the certain type to perform the task.

In some embodiments, interacting with the client device to measure the amount of time it takes the client device to perform a task comprises providing a software program to the client device for execution by the client device, and measuring the amount of time it takes the client device to execute the software program. In some embodiments, one or more inputs may be provided to the client device for inputting to the software program and the amount of time it takes the client device to use the software to generate one or more outputs based on the input(s) may be measured. In some embodiments, the output(s) may be verified for accuracy, for example, to verify that the client device actually executed the software program and did not fake the results.

In some embodiments, the software program provided to the client device may encode one or more computational challenges. Non-limiting examples of computational challenges include a serial cumulative calculation challenge, a parallel checkpoints calculation challenge, a neural network calculation challenge, and a graphics processing unit (GPU) calculation challenge. These challenges are described in greater detail below.

In some embodiments, to obtain the range of expected execution times associated with a task for a population of devices having a certain type, one or more tests may be run on one or multiple devices of the certain type to determine how long it takes the device(s) to perform the task. A task may include a combination of one or more selected operations executed in a certain order. However, it should be appreciated that aspects of the technology described herein are not limited to the use of a test comprising one or more selected operations executed in a selected order, as in some embodiments the one or more selected operations may be executed in different orders during different runs of a test (e.g., a randomly selected order for each run).

In some embodiments, the results of one or more tests run on one or more devices of a certain device type may be recorded and associated with that device type. Statistical analysis may be performed on the recorded results to identify one or more characteristics that may be used as a signature for that device type. As a non-limiting example, a characteristic may include an interval that is centered at a sample average and captures some percentage (e.g., 90%, 95%, 98%, etc.) of all of the samples.

The inventors have recognized and appreciated that, while it is possible to run tests on various hardware and develop a database of expected execution profiles for the various hardware, it may be costly to acquire a sufficiently large collection of test hardware and/or run a sufficiently large number of tests to ensure that the sample size is large enough for meaningful statistical analysis. Accordingly, in some embodiments, tests may be performed on user devices based on self-reported device type information. Thus, in some instances, test results associated with a device type may include a result from a device of a different type (e.g., when the device type is intentionally or accidentally misreported).

The inventors have recognized and appreciated that reliable statistics may be obtained despite the inclusion of such "bad" samples. For instance, if test results are received from a large number of devices purporting to be of a certain type (e.g., iPhone 5s), and a significant portion of the devices are actually of that type, then the statistics obtained (e.g., average execution time for a particular computational challenge) may not deviate significantly from "true" statistics that would have been obtained had the "bad" samples been removed. In this manner, anomalous results may be identified and it may be determined that devices exhibiting anomalous results are being spoofed. For example, if a result is close to the sample mean (e.g., within a threshold number of standard deviations from the sample mean), it may be inferred with a high level of confidence that the reporting device is not spoofed (e.g., using hypothesis testing or any other suitable technique). Conversely, if a result is far away from the sample mean, the level of confidence that the reporting device is not spoofed may be low.

In some embodiments, alternatively or additionally, a result of a computational challenge may be used as a component of a fingerprint of the reporting device. Any suitable combination of one or more operations may be used as part of a computational challenge, as aspects of the technology described herein are not so limited. For example, one or more mathematical operations for benchmarking hardware may be used. Examples of such benchmarking operations include, but are not limited to, integer math tests (e.g., addition, subtraction, division, multiplication, and/or exponentiation with large random integers), floating point math tests (e.g., addition, subtraction, division, multiplication, and/or exponentiation with floating point numbers), and prime number tests (e.g., identifying prime numbers using multiplication and modular arithmetic operations)

The inventors have recognized and appreciated that modern processors may be so fast that it may not be practical to measure the execution time of a single operation, or it may not be practical to compare execution times of two different processors when each is asked to perform only one operation. Accordingly, in some embodiments, results may be accumulated over multiple operations as part of the same computational challenge. For example, a device subject to the challenge may be asked to perform: (1) the same operation multiple times; (2) multiple operations that are different but of a same type; and/or (3) multiple operations of different types. This may produce more useful data, as differences between processors may be magnified through accumulation.

The inventors have also recognized and appreciated that a malicious entity may program a device to cheat a computational challenge. For example, if a device is asked to perform the same operation multiple times, the malicious entity may program the device to perform the operation only once and thereafter output the same answer without actually performing the operation. Accordingly, in some embodiments, techniques are provided to ensure that a device completes a computational challenge as instructed, without cheating.

In some embodiments, a computational challenge may include multiple operations that are all different, so that a processor must perform every operation to complete the challenge. However, the inventors have recognized and appreciated that verifying such a computational challenge may be burdensome, as a server administering the challenge must check every answer among many different answers (or a large number of randomly selected answers).

Alternatively, or additionally, a processor may be asked to solve a problem in which at least one first operation takes, as input, an output from at least one second operation. Below is a non-limiting example of such a chain of operations:

1. 1.6832*(5.22/(9.098123−0.2222222))
2. (The answer to problem 1)+6.8*(985.2+98611.0034)/6.4423
3. 87.23+(122562.13333/0.23001)/(the answer to problem 2)
4. etc.

In this manner, only one final output may be produced and checked by a server administering the challenge. Because of the dependencies between the operations, the processor may not be able to skip any operations in the chain. However, it should be appreciated that aspects of the present disclosure are not limited to the use of a single chain linking all operations in a computational challenge, as in some embodiments a computational challenge may include disparate operations and/or disparate chains.

III. Detecting Session Token Spoofing

During a digital interaction between a client device and an online system, the online system may provide the client device with a session token, which authorizes the client device to access one or more resources through the online system. The client device may be required to provide that session token to the online system along with every communication sent from the client device to the online system. As one example, when a user logs in with a secure web server, a web browser executing on the user's client device may be granted a session token, which authorizes the web browser to access a secure portion of a web site hosted by the web server (e.g., a web site of a financial institution). The web browser may be required to provide that session token along with every request subsequently sent to the web server (e.g., a request for a web page, a request to commit an action, etc.) to identify to the server that the request is a legitimate request from the client device.

The inventors have recognized and appreciated that a malicious entity may engage in session token spoofing by capturing a session token being sent from an online system (e.g., a web site) to a client device (e.g., used by a legitimate user to access information on the web site) during a digital interaction between the client device and the online system. The malicious entity may then use the captured token to make communications sent from the malicious entity to the online system appear as though they are coming from the client device of the legitimate user. The malicious entity may deploy computer viruses or other malware programs that may be able to monitor web traffic and identify tokens in transit. Accordingly, some embodiments of the technology described herein provide for techniques to detect and prevent such session token spoofing.

In some embodiments, the techniques involve using session tokens that include information indicating a state of the digital interaction between the client device and an online system. When an online system receives a session token, during a digital interaction with a client device, the online system may process the token to determine whether the session token is valid. In response to determining that the session token is valid, the online system may: (1) update the information indicating the state of the digital interaction; (2) obtain another session token including the updated information (by generating a new token with this information or updating the content of the received token); and (3) send the other session token to the client device for use in a subsequent communication with the online system. In this way, the content of the session token changes during the digital interaction between the client device and the online system and, for example, may change every time that an online system responds to a request from the client device. Changing the content of the session token in this manner makes it difficult for a malicious entity to spoof session tokens because, even if the malicious entity were to intercept a session token at one point during a digital interaction between the client device and the online system, the malicious entity could not reuse this session token at another point during the digital interaction because the content of the intercepted session token would be outdated by the time the malicious entity attempts to use it.

In some embodiments, an online system (e.g., a web server) may receive, during a digital interaction with a client device, a communication. The online system may determine whether the communication is from the client device by: (1) identifying a first secured token from the communication; (2) and processing the first secured token by obtaining, from the first secured token, information indicating a state of the digital interaction, and using the information indicating the state of the digital interaction to determine whether the communication is from the client device.

In some embodiments, when the online system determines that the communication is from the client device, the online system may: (1) cause at least one action responsive to the communication to be performed (the action may include, for example, providing a webpage or other information to the client device, committing an action performed by the user on a webpage, etc.); (2) update the information indicating the state of the digital interaction to obtain updated information indicating the state of the digital interaction; (3) obtain a second secured token comprising the updated information indicating the state of the digital interaction (e.g., by generating a new token with such information or updating the first secured token to include such information); and (4) provide the second secured token to the client device for use in a subsequent communication during the digital interaction.

In some embodiments, the information indicating the state of the digital interaction includes a value indicating a number of times the information indicating the state of the digital interaction was changed by the online system. For example, the information indicating the state of the digital interaction may include a sequence number counting the number of times content in the session token has been modified. In some embodiments, the online system may increase the sequence number by one (or any other suitable number) when (e.g., each time) the online system responds to a communication (e.g., a request) from the client device.

Accordingly, in some embodiments, the information indicating the state of the digital interaction may include a first value indicating a number of times the information indicating the state of the digital interaction was changed by the online system, and updating the information indicating the state of the digital interaction may include changing (e.g., incrementing or otherwise increasing) the first value to obtain a second value.

In some embodiments, after providing the second secured token to the client device, the online system may receive a second communication. The online system may determine whether the second communication is from the client device by: (1) identifying a third secured token from the second communication; (2) and processing the third secured token to obtain a third value indicating the number of times the information indicating the state of the digital interaction was changed by the at least one computer; and (3) determining that the second communication is from the client device when the third value matches the second value.

In some embodiments, the information indicating the state of the digital interaction may include a timestamp indicating the last time the session token was modified and/or a type of web page through which the session token was granted. In some embodiments, the online system may modify at least some of this content when the online system responds to a communication from the client device. When the online system modifies such content, thereby changing the state of the digital interaction, the online system may change (e.g., by incrementing or otherwise increasing) the value indicating the number of times the state of the digital interaction was changed by the online system. It should be appreciated that a session token may include content other than information indicating the state of the digital interaction. Non-limiting examples of data that may be included in a session token include a global unique identifier (e.g., a 128-bit global unique identifier) and a timestamp for when the token was created.

In some embodiments, processing the first secured token to determine whether the communication is from the client device comprises comparing the information indicating the state of the digital interaction with information about the state of the digital interaction maintained by the at least one computer. For example, the online system may obtain, from the first secured token, a sequence number indicating the number of different tokens the online system sent to the client device during the digital interaction and compare that sequence number with a local version of the sequence number maintained by the online system.

In some embodiments, the first secured token may include an encrypted token, processing the first secured token may include decrypting the encrypted token to obtain a decrypted token, and providing the second secured token may include encrypting a token comprising the updated information indicating the state of the digital interaction. For example, in some embodiments, when a server receives a previously issued session token along with a request, the server may decrypt the session token to determine whether the session token is valid. If the token is invalid, the server may deny the request. Otherwise, the server may update the token, for example, by updating one or more timestamps, updating a page type to indicate the type of page via which the current request is submitted, incrementing a sequence number, updating information indicating the URL or derived (e.g., by hashing) from the URL that was last visited, etc. The updated token may then be re-encrypted and returned to the client device making the request.

In some embodiments, session tokens may be encrypted to prevent an unauthorized entity from reading and/or tampering with the tokens. For example, a symmetric encryption scheme may be used, so that only an entity in possession of a secret key for the symmetric encryption scheme may decrypt and read the token. Any suitable symmetric encryption scheme may be used, including, but not limited to, 256-bit AES encryption. The inventors have recognized and appreciated that 256-bit AES encryption may provide a suitable level of security, as by some estimates it would take the most powerful computer currently available over 1 billion years to mount a successful "brute force" attack. However, it should be appreciated that aspects of the technology described herein are not limited to the use of symmetric encryption, as in some embodiments other cryptographic techniques may be used additionally or alternatively. As one example, a symmetric key encryption scheme may be used. As another example, a digital signature scheme may be used in addition to, or instead of, encryption. Because it may be computationally infeasible for an attacker to forge a signature, an attacker may be unable to modify an existing token or forge a new token, even if the attacker may be able to read the token. Accordingly, a secured session token may be a token secured by use of encryption (of any suitable type including symmetric encryption and asymmetric encryption) and/or any other cryptographic scheme (e.g., digital signatures, hashing, etc.)

In some embodiments, a server may generate a session token and use a secret key for a symmetric encryption scheme to encrypt the session token. As long as no other entity gains access to the secret key, an encrypted token may be decrypted only by the server that generated the token. The server may then provide the token to a client device (e.g., an application program executing on the client device such as a web browser), and the client device may be expected to submit the token with all subsequent requests made by the client device to the server.

In some embodiments, session tokens may expire after a threshold amount of time (e.g., 15 minutes, 30 minutes, etc. from last activity). A client device may be denied access to a resource if the client device makes the request using an expired session token. In some embodiments, a client device may be allowed to refresh an expired token. For example, the user of the client device may log into the online system again to regain access to one or more resources accessible through the online system (e.g., a secure portion of a web site). If the user logs in successfully, the online system may grant a new session token to the client device.

In some embodiments, an online system may be configured to examine the timing of requests to determine whether a session token is being used illegitimately. For example, a typical user may make requests sequentially (e.g., logging in, checking account balance, paying bills, updating personal information, etc.). Thus, if an online system receives two requests simultaneously with the same session token, at least one of the requests may be illegitimate.

However, the inventors have recognized and appreciated that some users make use of tabbed browsing in a secure session, which may result in legitimate requests being made simultaneously. For example, a user of a banking web site may have two tabs open, and may use one tab for viewing transaction history and the other tab for making a payment. From the perspective of an online system, it may be difficult to distinguish between requests resulting from a legitimate use of tabbed browsing and the requests resulting from malware exploiting a session token. For instance, multiple requests resulting from tabbed browsing may arrive to an online system in quick succession and/or out of sequence, so that judging the validity of a request based on timing may be ineffective.

Accordingly, in some embodiments, techniques are provided for classifying requests containing a token, taking into account at least one piece of information beyond the timing of the requests. The inventors have recognized and appreciated that such techniques may be effective in distinguishing legitimate tabbed browsing from malware exploiting a session token.

In some embodiments, a web site may be provided with software code (e.g., written in JavaScript or in any other suitable programming language(s)) to determine whether a request is legitimate by analyzing one or more characteristics of the request. For example, the software code, when executed, may examine a sequence of events associated with the request and look for certain anomalies that may suggest the presence of malware.

Below is an illustrative sequence of events resulting from a legitimate user practicing tabbed browsing, in accordance with some embodiments of the technology described herein:
1. User visits financial institution web site using a web browser executing on client device. The web site is being hosted on a server.
2. User logs into the financial institution web site with a user name and password.
   a. Server generates token with sequence number 0 and page type login.
3. User views account balance page.
   a. Server generates token with sequence number 1 and page type account balance.
      i. User opens a new tab in the web browser and navigates to a personal information page.
         1) Server generates token with sequence number 2 and page type personal information.
      ii. User updates personal information and closes tab.
         1) Server receives token with sequence number 2 and page type personal information.
4. User makes transfer from account balance page in original tab.
   a. Server receives token with sequence number 1 and page type account balance.
5. User logs out.

As illustrated in the above example, legitimate tabbed browsing may cause tokens to be received out of sequence (e.g., the session token with sequence number 1 is received after the session token with sequence number 2). Thus, absent one or more other indicators, such as requests being received from different user agents, out-of-sequence tokens alone may not be sufficient to suggest the presence of malware.

Below is an illustrative sequence of events resulting from a virus or other malware exploiting a session token:
1. User visits financial institution web site.
2. User logs into the web site with a user name and password.
   a. Server generates token with sequence number 0 and page type login.
3. User views account balance page.
   a. Server generates token with sequence number 1 and page type account balance.
4. User views personal information page.
   a. Server generates token with sequence number 2 and page type personal information.
5. At the same time, malware makes AJAX (asynchronous JavaScript and XML) call to initiate funds transfer using original token (sequence 0 and page type login).
6. User logs out.

In some embodiments, a security system may be programmed (e.g., using JavaScript or any other suitable programming language(s)) to identify one or more suspicious characteristics from a sequence of events such as the sequence immediately above. Examples of suspicious characteristics include, but are not limited to:
   The funds transfer request occurred with a mismatched token (sequence 0 and page type login).
      The page type was incorrect. A funds transfer request may only be made via one or more selected pages, but the login page is not among the one or more selected pages.
      A legitimate user would be able to make a funds transfer request via the account balance page, but the account balance page had not been loaded at the time token sequence number 0 was generated.
   The funds transfer request happened simultaneously as the view personal information transaction.
      A legitimate user would not be able to send two transactions at the same time.
   The funds transfer request did not originate from a front-end of the user's browser, but instead was transmitted as an AJAX call, which may suggest the funds transfer request was programmatically executed, instead of being manually executed.

By looking for one or more suspicious characteristics and/or suspicious combinations of characteristics, an illegitimate request may be identified in real time (e.g., before the request is granted) so that such a request may be denied. Although examples of suspicious characteristics are described herein, it should be appreciated that aspects of the technology described herein are not limited to these examples, as an a security system and/or online system may be programmed to detect other characteristics in addition to, or instead of, those discussed herein.

IV. Further Descriptions

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A shows an illustrative system 10 via which digital interactions may take place, in accordance with some embodiments. In this example, the system 10 includes user devices 11A, 11B, and 11C, online systems 12 and 13, and a security system 14. A user 15 may use the user devices 11A, 11B, and 11C to engage in one or more digital interactions. For instance, the user device 11A may be a smart phone and may be used by the user 15 to check email and download music, the user device 11B may be a tablet computer and may be used by the user 15 to shop and bank, and the user device 11C may be a laptop computer and may be used by the user 15 to watch TV and play games.

It should be appreciated that the user 15 may engage in other types of digital interactions in addition to, or instead of, those mentioned above, as aspects of the technology described herein are not limited to the analysis of any particular type of digital interactions. Also, digital interactions are not limited to interactions that are conducted via an Internet connection. For example, a digital interaction may involve an ATM transaction over a leased telephone line.

Furthermore, it should be appreciated that the particular combination of user devices 11A-C is provided solely for purposes of illustration, as the user 15 may use any suitable device or combination of devices to engage in digital interactions, and the user may use different devices to engage in a same type of digital interactions (e.g., checking email).

In some embodiments, a digital interaction may involve an interaction between the user 15 and an online system, such as the online system 12 or the online system 13. For instance, the online system 12 may include an application server that hosts a backend of a banking app used by the user 15, and the online system 13 may include a web server that hosts a retailer's web site that the user 15 visits using a web browser. It should be appreciated that the user 15 may interact with other online systems (not shown) in addition to, or instead of the online systems 12 and 13. For example, the user 15 may visit a pharmacy's web site to have a prescription filled and delivered, a travel agent's web site to book a trip, a government agency's web site to renew a license, etc.

In some embodiments, behaviors of the user 15 may be measured and analyzed by the security system 14. For instance, the online systems 12 and 13 may report, to the security system 14, behaviors observed from the user 15. Additionally, or alternatively, the user devices 11A-C may report, to the security system 14, behaviors observed from the user 15. As one example, a web page downloaded from the web site hosted by the online system 13 may include software (e.g., a JavaScript snippet) that programs the browser running on one of the user devices 11A-C to observe and report behaviors of the user 15. Such software may be provided by the security system 14 and inserted into the web page by the online system 13. As another example, an application program running on one of the user devices 11A-C may be programmed to observe and report behaviors of the user 15. The application program may be programmed via software (e.g., JavaScript) provided by the security system. The behaviors observed by the application program may include interactions between the user 15 and the application program, and/or interactions between the user 15 and another application. As another example, an operating system running on one of the user devices 11A-C may be programmed to observe and report behaviors of the user 15.

It should be appreciated that software that observes and reports behaviors of a user may be written in any suitable language, and may be delivered to a user device in any suitable manner. For example, the software may be delivered by a firewall (e.g., an application firewall), a network operator (e.g., Comcast, Sprint, etc.), a network accelerator (e.g., Akamai), or any device along a communication path between the user device and an online system, or between the user device and a security system.

In some embodiments, the security system 14 may be configured to ascertain the capabilities of one or more application programs executing on any one of user devices 11A-C. For example, the security system 14 may be configured to provide a software program (which may be written in any suitable language) to user device 11A that, when executed by the user device 11A, collects information about an application program executing on the user device 11A and sends the collected information to the security system 14. In turn, the security system 14 may use the received information to determine whether the application program is of the type that one or more previous communications (e.g., from the user device 11A) asserted it to be. As a specific example, in response to a request from a web browser application program executing on user device 11A to access a web page (e.g., a webpage hosted by online system 12), security system 14 (e.g., upon being notified of the request by the online system 12) may send JavaScript code to the user device 11A. The request from the web browser application program may identify the application program as having an asserted identity (e.g., Internet Explorer 11.0). In response to receiving the JavaScript code from security system 14, the user device 11A may execute the received JavaScript code that, while executing, collects information that can be used by security system 14 to determine whether the web browser application program executing on user device 11A has the asserted identity (e.g., whether it really is Internet Explorer 11.0).

In some embodiments, the security system 14 may be configured to determine whether a user device (e.g., user device 11A) is of an asserted type. To this end, the security system 14 may interact with the user device to obtain additional information about the user device and determine whether the additional information about the user device is consistent with the asserted type of the user device. For example, the security system 14 may be configured to provide a software program to the user device for execution by the user device. After the user device executed the received software program, the time taken by the user device may be used to determine whether the user device is of the asserted type, for example, by comparing the amount of time taken by the user device to execute the received software program with information indicating how long it takes devices having the asserted type to execute the same software program). The software program sent by the security system 14 may include a computational challenge, as described in greater detail below.

Although only one user (i.e., the user 15) is shown in FIG. 1A, it should be appreciated that the security system 14 may be programmed to measure and analyze behaviors of many users across the Internet. Furthermore, it should be appreciated that the security system 14 may interact with other online systems (not shown) in addition to, or instead of the online systems 12 and 13. The inventors have recognized and appreciated that, by analyzing digital interactions involving many different users and many different online systems, the security system 14 may have a more comprehensive and accurate understanding of how the users behave. However, aspects of the present disclosure are not limited to the analysis of measurements collected from different online systems, as one or more of the techniques described herein may be used to analyze measurements collected from a single online system. Likewise, aspects of the present disclosure are not limited to the analysis of measurements collected from different users, as one or more of the techniques described herein may be used to analyze measurements collected from a single user.

Figure 1B:
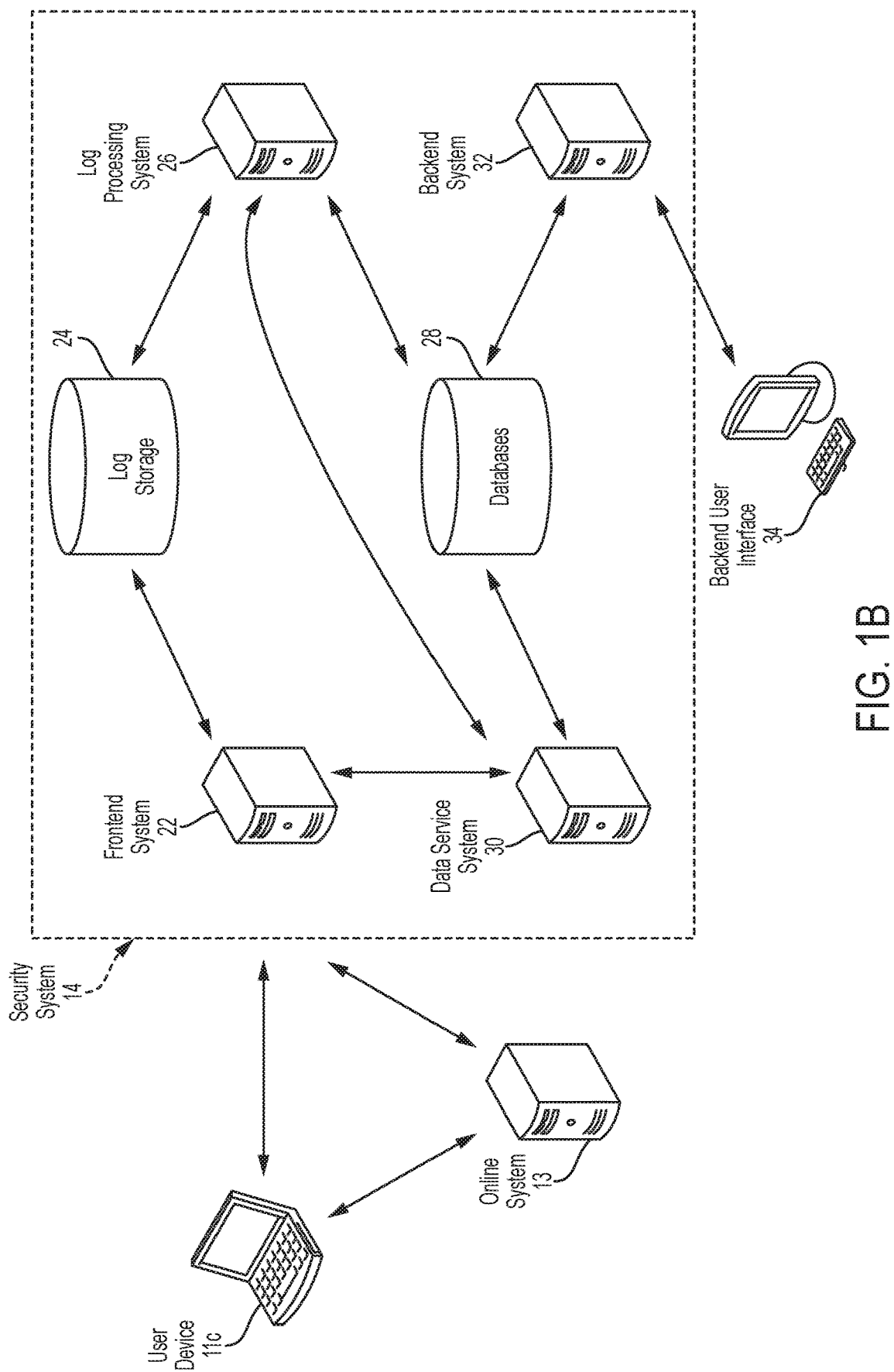
FIG. 1B shows an illustrative security system 14 for processing data collected from digital interactions, in accordance with some embodiments of the technology described herein.

FIG. 1B shows an illustrative implementation of the security system 14 shown in FIG. 1A, in accordance with some embodiments. In this example, the security system 14 includes one or more frontend systems and/or one or more backend systems. For instance, the security system 14 may include a frontend system 22 configured to interact with user devices (e.g., the illustrative user device 11C shown in FIG. 1A) and/or online systems (e.g., the illustrative online system 13 shown in FIG. 1A). Additionally, or alternatively, the security system 14 may include a backend system 32 configured to interact with a backend user interface 34. In some embodiments, the backend user interface 34 may include a graphical user interface (e.g., a dashboard) for displaying current observations and/or historical trends regarding individual users and/or populations of users. Such an interface may be delivered in any suitable manner (e.g., as a web application or a cloud application), and may be used by any suitable party (e.g., security personnel of an organization).

In the example shown in FIG. 1B, the security system 14 includes a log storage 24. The log storage 24 may store log files comprising data received by the frontend system 22 from user devices (e.g., the user device 11C), online systems (e.g., the online system 13), and/or any other suitable sources. A log file may include any suitable information. For instance, in some embodiments, a log file may include keystrokes and/or mouse clicks recorded from a digital interaction over some length of time (e.g., several seconds, several minutes, several hours, etc.). Additionally, or alternatively, a log file may include other information of interest, such as account identifier, network address, user device identifier, user device characteristics, URL accessed, Stocking Keeping Unit (SKU) of viewed product, etc.

In some embodiments, the log storage 24 may store log files accumulated over some suitable period of time (e.g., a few years), which may amount to tens of billions, hundreds of billions, or trillions of log files. Each log file may be of any suitable size. For instance, in some embodiments, about 60 kilobytes of data may be captured from a digital interaction per minute, so that a log file recording a few minutes of user behavior may include a few hundred kilobytes of data, whereas a log file recording an hour of user behavior may include a few megabytes of data. Thus, the log storage 24 may store petabytes of data overall.

The inventors have recognized and appreciated it may be impractical to retrieve and analyze log files from the log storage 24 each time a request for the data in the logs is received. For instance, the security system 14 may be expected to respond to a request for log data within 100 msec, 80 msec, 60 msec, 40 msec, 20 msec, or less. The security system 14 may be unable to identify and analyze all relevant log files from the log storage 24 within such a short window of time. Accordingly, in some embodiments, a log processing system 26 may be provided to filter, transform, and/or route data from the log storage 24 to one or more databases 28.

The log processing system 26 may be implemented in any suitable manner. For instance, in some embodiments, the log processing system 26 may include one or more services configured to retrieve a log file from the log storage 24, extract useful information from the log file, transform one or more pieces of extracted information (e.g., adding latitude and longitude coordinates to an extracted address), and/or store the extracted and/or transformed information in one or more appropriate databases (e.g., among the one or more databases 28).

In some embodiments, the one or more services may include one or more services configured to route data from log files to one or more queues, and/or one or more services configured to process the data in the one or more queues. For instance, each queue may have a dedicated service for processing data in that queue. Any suitable number of instances of the service may be run, depending on a volume of data to be processed in the queue.

The one or more databases 28 may be accessed by any suitable component of the security system 14. As one example, the backend system 32 may query the one or more databases 28 to generate displays of current observations and/or historical trends regarding individual users and/or populations of users. As another example, a data service system 30 may query the one or more databases 28 to provide input to the frontend system 22.

Figure 10:
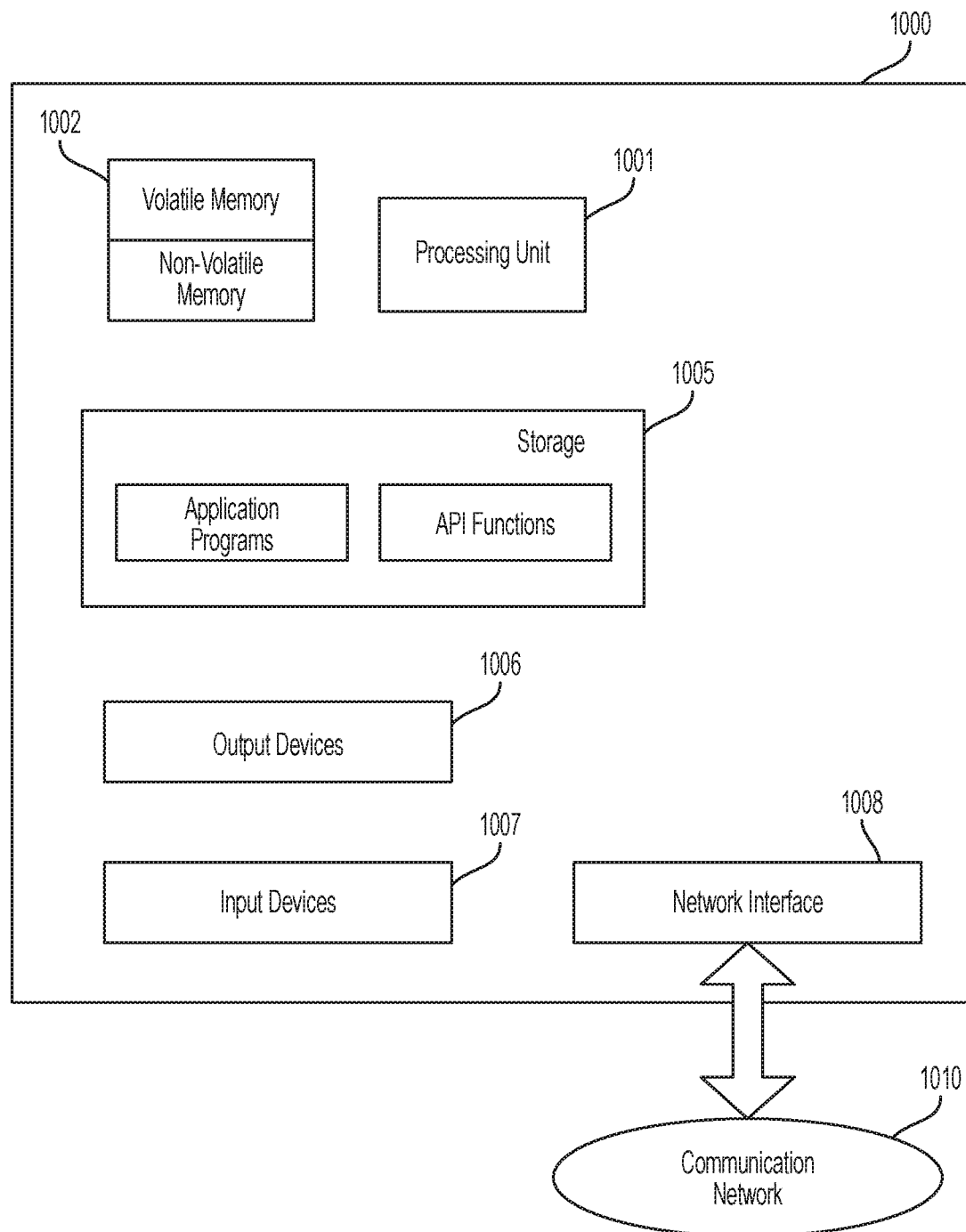
FIG. 10 shows, schematically, an illustrative computer 1000 on which any aspect of the technology described herein may be implemented.

The inventors have recognized and appreciated that some database queries may be time consuming. For instance, if the frontend system 22 were to query the one or more databases 28 each time a request to match sameness is received, the frontend system 22 may be unable to respond to the request within 100 msec, 80 msec, 60 msec, 40 msec, 20 msec, or less. Accordingly, in some embodiments, the data service system 30 may maintain one or more data sources separate from the one or more databases 28. Examples of data sources maintained by the data service system 30 are shown in FIGS. 8B and 10, and are discussed below.

In some embodiments, a data source maintained by the data service system 30 may have a bounded size, regardless of how much data is analyzed to populate the data source. For instance, if there is a burst of activities from a certain account, an increased amount of data may be stored in the one or more databases 28 in association with that account. The data service system 30 may process the data stored in the one or more databases 28 down to a bounded size, so that the frontend system 22 may be able to respond to requests in constant time.

Various techniques are described herein for processing incoming data. For instance, in some embodiments, all possible network addresses may be divided into a certain number of buckets. Statistics may be maintained on such buckets, rather than individual network addresses. In this manner, a bounded number of statistics may be analyzed, even if an actual number of network addresses observed may fluctuate over time. One or more other techniques may also be used in addition to, or instead of bucketing, such as maintaining an array of a certain size.

In some embodiments, the data service system 30 may include a plurality of data services (e.g., implemented using a service-oriented architecture). For example, one or more data services may access the one or more databases 28 periodically (e.g., every hour, every few hours, every day, etc.), and may analyze the accessed data and populate one or more first data sources used by the frontend system 22. Additionally, or alternatively, one or more data services may receive data from the log processing system 26, and may use the received data to update one or more second data sources used by the frontend system 22. Such a second data source may supplement the one or more first data sources with recent data that has arrived since the last time the one or more first data sources were populated using data accessed from the one or more databases 28. In various embodiments, the one or more first data sources may be the same as, or different from, the one or more second data sources, or there may be some overlap.

Although details of implementation are shown in FIG. 1B and discussed above, it should be appreciated that aspects of the technology described herein are not limited to the use of any particular component, or combination of components, or to any particular arrangement of components. Furthermore, each of the frontend system 22, the log processing system 26, the data service system 30, and the backend system 32 may be implemented in any suitable manner, such as using one or more parallel processors operating at a same location or different locations.

FIG. 1C shows an illustrative flow 40 within a digital interaction, in accordance with some embodiments. In this example, the flow 40 may represent a sequence of activities conducted by a user on a merchant's web site. For instance, the user may log into the web site, change billing address, view a product details page of a first product, view a product details page of a second product, add the second product to a shopping cart, and then check out.

In some embodiments, a security system may receive data captured from the digital interaction throughout the flow 40. For instance, the security system may receive log files from a user device and/or an online system involved in the digital interaction (e.g., as shown in FIG. 1B and discussed above).

The security system may use the data captured from the digital interaction in any suitable manner. For instance, as shown in FIG. 1B, the security system may process the captured data and populate one or more databases (e.g., the one or more illustrative databases 28 shown in FIG. 1B). Additionally, or alternatively, the security system may populate one or more data sources adapted for efficient access. For instance, the security system may maintain current interaction data 42 in a suitable data structure. As one example, the security system may keep track of different network addresses observed at different points in the flow 40 (e.g., logging in and changing billing address via a first network address, viewing the first and second products via a second network address, and adding the second product to the cart and checking out via a third network address). As another example, the security system may keep track of different credit card numbers used in the digital interaction (e.g., different credit cards being entered in succession during checkout). The data structure may be maintained in any suitable manner and by any suitable component of the security system (e.g., the illustrative frontend system 22 and/or the illustrative data service system 30).

In some embodiments, the security system may maintain historical data 44 in a suitable data structure in addition to or instead of the current interaction data 42. The historical data 44 may include one or more profiles. For instance, for each anchor value observed from the digital interaction, the security system may use the data captured from the digital interaction to update a profile associated with that anchor value.

In some embodiments, the security system may maintain population data 46, in addition to, or instead of the current interaction data 42 and/or the historical data 44. For instance, the security system may update, in real time, statistics such as breakdown of web site traffic by user agent, geographical location, product SKU, etc. As one example, the security system may use a hash-modding method to divide all known browser types into a certain number of buckets (e.g., 10 buckets, 100 buckets, etc.). For each bucket, the security system may calculate a percentage of overall web site traffic that falls within that bucket. As another example, the security system may use a hash-modding method to divide all known product SKUs into a certain number of buckets (e.g., 10 buckets, 100 buckets) and calculate respective traffic percentages. Additionally, or alternatively, the security system may calculate respective traffic percentages for combinations of buckets (e.g., a combination of a bucket of browser types, a bucket of product SKUs, etc.).

In some embodiments, the security system may render any one or more aspects of the current interaction data 42, the historical data 44, and/or the population data 46 (e.g., via the illustrative backend user interface 34 shown in FIG. 1B). For instance, the security system may render breakdown of web site traffic (e.g., with actual traffic measurements, or percentages of overall traffic) using a stacked area chart.

Figure 2B:
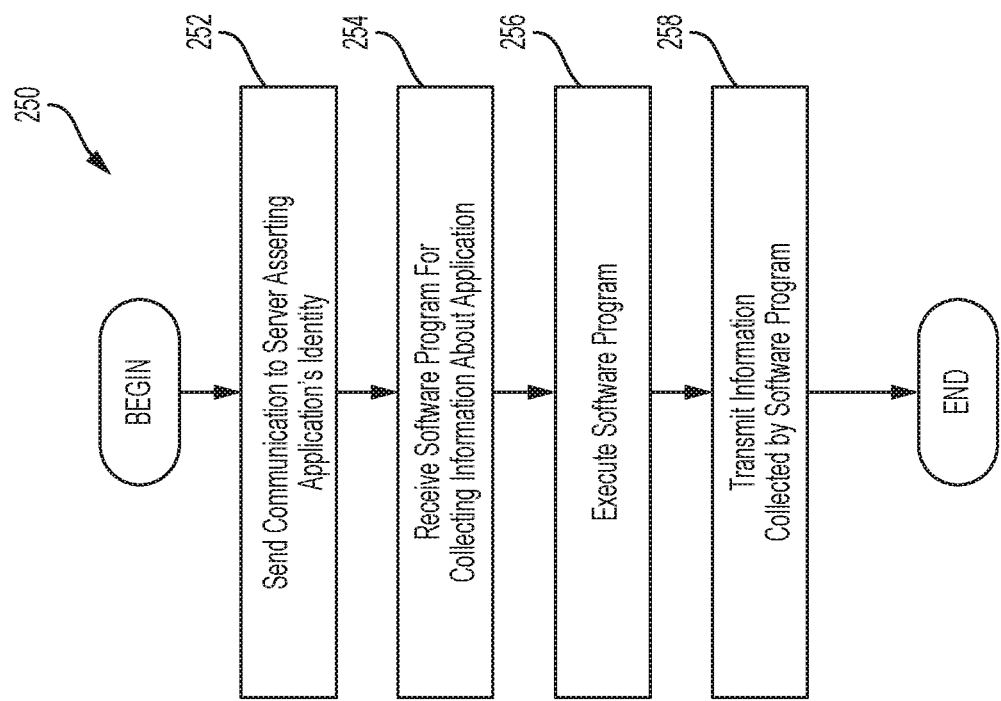
FIG. 2B is a flowchart of an illustrative process, performed by a client device, as part of a technique for detecting application program spoofing, in accordance with some embodiments of the technology described herein.
Figure 2A:
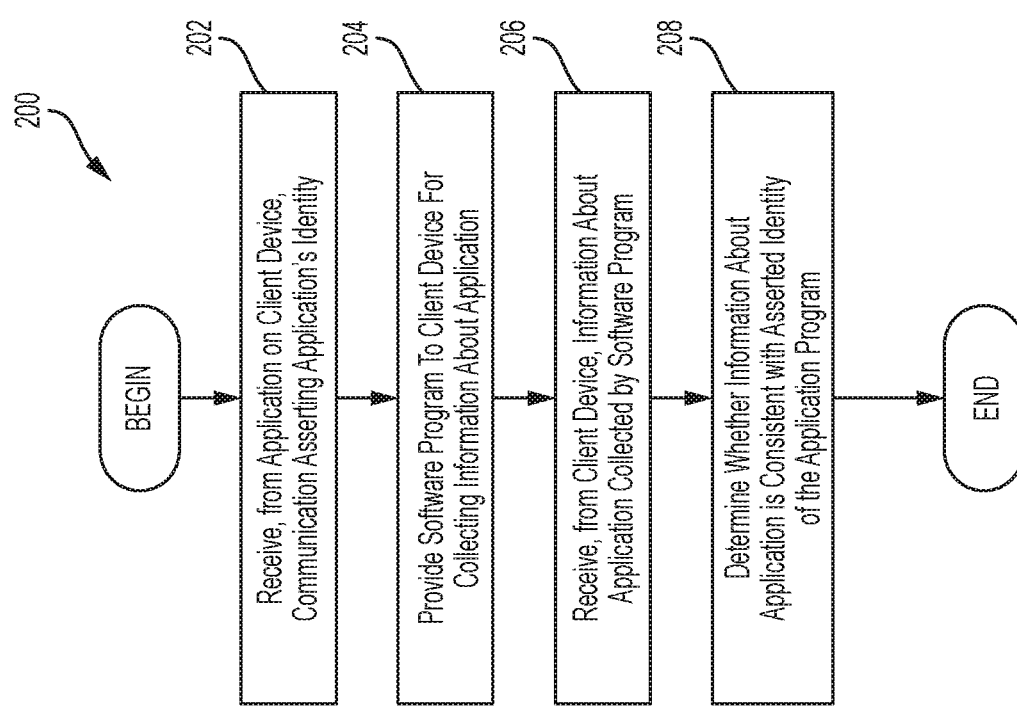
FIG. 2A is a flowchart of an illustrative process, performed by a security system, for detecting application program spoofing, in accordance with some embodiments of the technology described herein.

FIG. 2A is a flowchart of an illustrative process 200 for detecting application program spoofing, in accordance with some embodiments of the technology described herein. The process 200 may be performed by any suitable system and/or computing device and, for example, may be performed by security system 14 described with reference to FIG. 1A.

Process 200 begins at act 202, where the system executing process 200 (e.g., security system 14) receives a communication asserting an application's identity from an application program executing on a client device (e.g., one of user devices 11A, 11B, and 11C described with reference to FIG. 1A). The system may receive the communication directly from the client device or indirectly, for example, via another system that received the communication first (e.g., online system 12 or 13 described with reference to FIG. 1A). In some embodiments, the communication may assert that the application's identity is a web browser application program and, in some embodiments, may include information about the web browser application program such as, for example, a version of the web browser. In some embodiments, the communication may include an HTTP request and the HTTP request may include information asserting the application program's identity (e.g., in the User Agent field of the HTTP request). At act 202, the system executing process 200 may process the received communication to identify the asserted identity of the application program from the communication (e.g., by accessing information in the User Agent field of the HTTP request in the communication).

Next, process 200 proceeds to acts 204 and 206, where the system executing process 200 interacts with the client device to verify the asserted identity of the application program. First, at act 204, the system provides a software program to the client device for collecting information about the application program. In some embodiments, the software program may be a JavaScript program. It should be appreciated, however, that the software program may be written in any other suitable programming language(s) instead of Javascript, as aspects of the technology described herein are not limited in this respect. In addition, the software program may be provided in any suitable format, as aspects of the technology described herein are not limited in this respect.

In some embodiments, the software program may be configured to programmatically determine and/or test one or more capabilities of the application program. For example, when executed by the client device, the software program may be configured to determine whether the application program is configured to recognize an object that application programs having the asserted identity are able to recognize. As one example, if an HTTP request were to identify the requesting program as a particular type of web browser (e.g., Opera, Internet Explorer, etc.), the software program may be configured to determine whether the requesting program recognizes an object that web browsers having the asserted identity are able to recognize (respectively, window.opera, window.ActiveXObject, etc.). As another example, the software program may be configured to determine whether the requesting program recognizes a document object model (DOM) object that web browsers having the asserted identity are able to recognize. As yet another example, the software program may be configured to determine whether the requesting program can access a variable or a client device resource (e.g., an environment variable, an operating system resource, hardware on the client device) that web browsers having the asserted identity are able to access.

Next, at act 206, the system executing process 200 receives, from the client device, the information collected by the software program provided to the client device at act 204. The system may receive the collected information directly from the client device or indirectly. The received information may indicate, for each of one or more of the capabilities of the application program tested by executing the software program on the client device, whether the application program does or does not have the capability. The received information may be in any suitable format, as aspects of the technology described herein are not limited in this respect.

Next, at act 208, the system executing process 200 determines whether the information received at act 206 is consistent with the asserted identity of the application program. This may be done in any suitable way. For example, the collected information about one or more capabilities of the application program (indicating whether or not the application program has these capabilities) may be compared with information about the same capabilities of application programs having the same identity. As one example, if web browsers of the asserted identity (e.g., Google Chrome version 47.0.2526.83) are able to recognize a particular type of object, and the information received at act 206 indicates that the application program does not recognize this particular type of object, a determination may be made that the application program is being spoofed—the communication received at act 202 misrepresents the identity of the application program (e.g., by stating that it is Google Chrome version 47.0.2526.83 when it is not). On the other hand, if the information received at act 206 indicates that the application program does recognize this particular type of object, a determination may be made that the received information is consistent with the asserted identity of the application. In turn, this determination may be used to verify, either on its own or on the basis of further comparisons of capabilities, that the application program has the asserted identity.

In response to determining that the identity of the application program is being spoofed, the security system may take any suitable type of action including, but not limited to, denying the client device access to a resource the client device is requesting (e.g., access to a webpage, access to a service), adding information about the client device to a list of client devices to block, notifying one or more users that a communication with a spoofed device type was received. On the other hand, in response to determining that the application program identity is not being spoofed, the security system may grant the client device access to a resource the client device may be requesting or perform further checks in connection with the received communication from the client device (e.g., by checking whether the communication misrepresents the device type of the client device, according to techniques described herein).

FIG. 2B is a flowchart of an illustrative process 250 performed as part of a technique for detecting application program spoofing, in accordance with some embodiments of the technology described herein. Process 250 may be performed by any suitable computing device. For example, process 250 may be performed by any of user devices 11A, 11B, and 11C, described with reference to FIG. 1A. Process 250 and process 200 may be performed complementarily. For example, a security system may interact with a client device by executing acts of process 200 and the client device may interact with the security system by executing acts of process 250. This interaction may take place in real-time so that the acts performed by the security system are performed in response to acts performed by the client device and vice versa.

Process 250 begins at act 252, where an application program executing on the client device performing process 250 generates and sends to a server a communication asserting the application program's identity. The communication may include an HTTP request and may assert that the identity of the application program is a particular type of web browser application program. In the case of a legitimate user, the application program may be, in fact, a web browser. On the other hand, in the case of a malicious entity, the application program may not be a web browser and, for example, may be a script or other type of application such as a bot used as part of an attack on the server.

Next, at act 254, the client device receives, from at least one computer, directly or indirectly, a software program for collecting information about one or more capabilities of the application program executing on the client device. In some embodiments, the at least one computer may be part of a security system (e.g., security system 14).

Next, at act 256, the client device executes the software program received at act 254. As it is being executed, the software program collects information about one or more capabilities of the client device. The collected information is then transmitted back to the at least one computer at act 258.

In some embodiments, a decision logic may be used (e.g., as part of process 200) to determine whether information about the capabilities of an application program executing on a client device, which was collected by a software program sent to the client device, are consistent with the asserted identity of the application program. The decision logic may specify one or more rules regarding capabilities of application programs that may be applied to the information obtained by the software program to determine whether the application program has the asserted identity. An example of such a decision logic—decision logic 300—is shown in FIG. 3.

Figure 3:
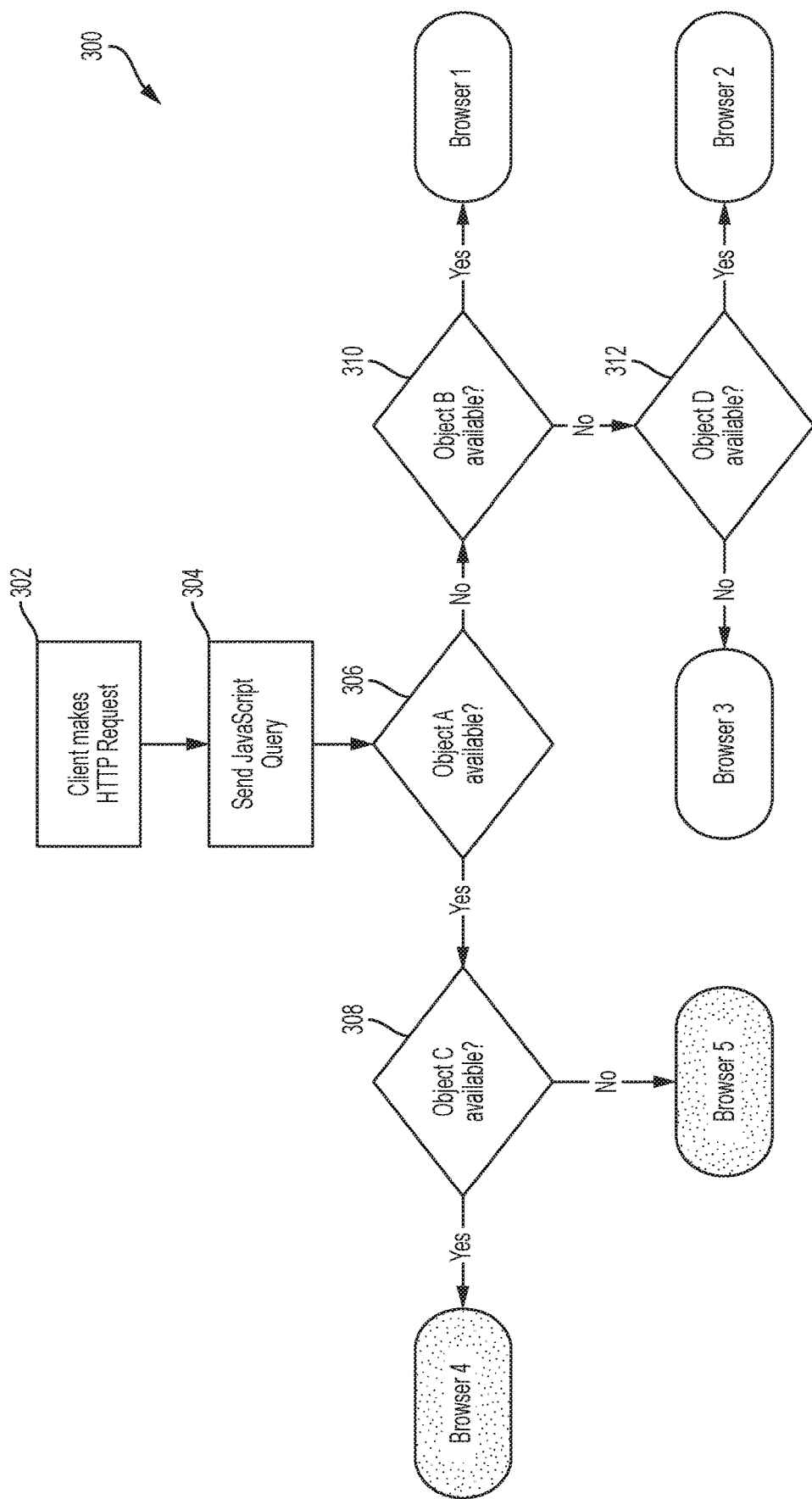
FIG. 3 shows an illustrative decision logic for determining whether information about the capabilities of an application program is consistent with the asserted identity of the application program, in accordance with some embodiments of the technology described herein.

As shown in the illustrative example of FIG. 3, a client device makes an HTTP request at step 302. In response to receiving the HTTP request, directly or indirectly, a security system sends a JavaScript query to the client device, the JavaScript query including JavaScript instructions that, when executed by the client device, collect information about whether the application program executing on the client device can access one or more of objects A-D, as illustrated in blocks 306, 308, 310, and 312. Depending on the results of these tests, the decision logic identifies a web browser type from a set of web browser types (e.g., web browsers 1-5), as indicated in FIG. 3.

It should be appreciated that the example shown in FIG. 3 and described above is provided solely for purposes of illustration. Aspects of the technology described herein are not limited to testing accessibility of objects, as other types of capability tests may be used additionally or alternatively. Moreover, aspects of the technology described herein are not limited to identification of a single possibility (e.g., a particular browser type), as in some embodiments a set of possibilities may be identified (e.g., a set of possible browser types).

It should also be appreciated that aspects of the technology described herein are not limited to the use of a decision logic to identify possible browser types. In some embodiments, for example, a decision logic may be used to identify one or more possibilities, where each possibility may be a combination of one or more characteristics. Examples of such characteristics include, but are not limited to screen resolution, local time zone, accelerometer status, browser plugin availability, and language.

Figure 4B:
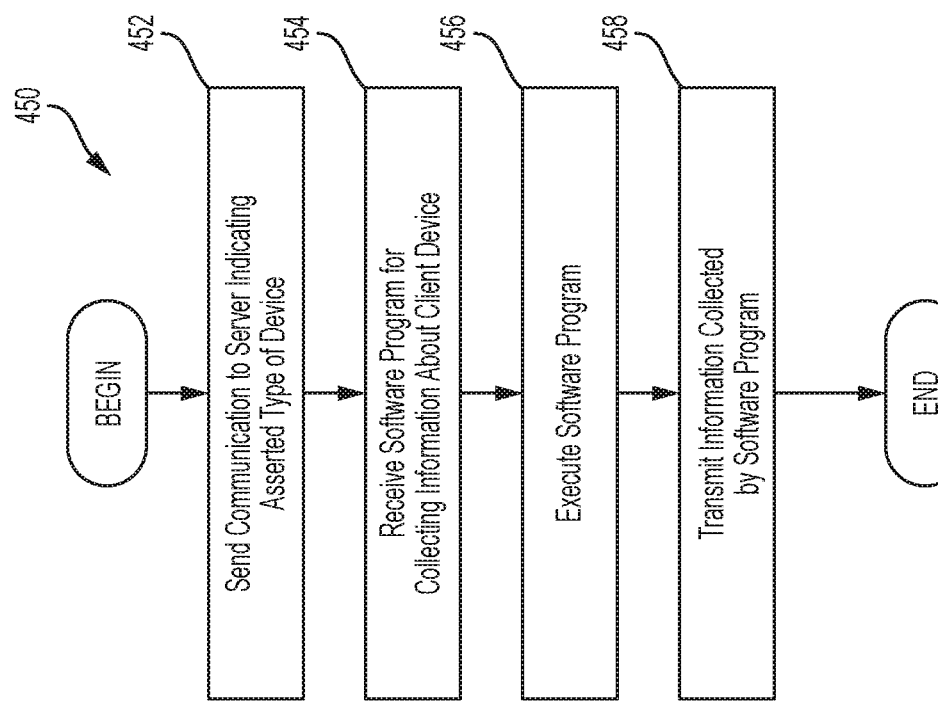
FIG. 4B is a flowchart of an illustrative process, performed by a client device, as part of a technique for detecting device type spoofing, in accordance with some embodiments of the technology described herein.
Figure 4A:
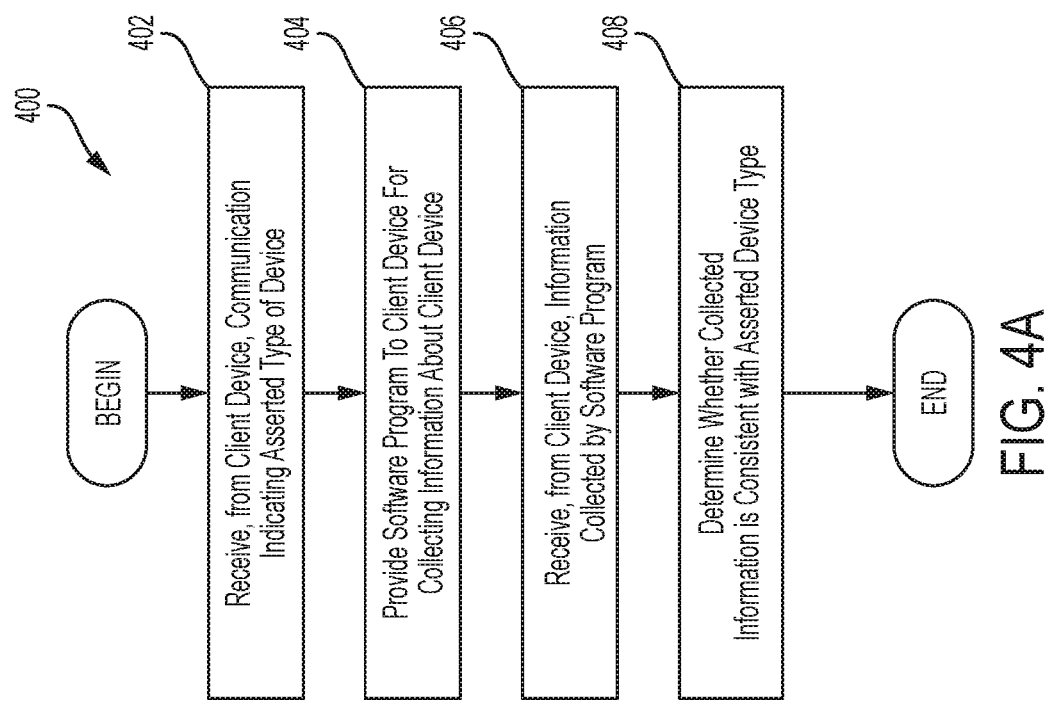
FIG. 4A is a flowchart of an illustrative process, performed by a security system, for detecting device type spoofing, in accordance with some embodiments of the technology described herein.

FIG. 4A is a flowchart of an illustrative process 400 for detecting device type spoofing, in accordance with some embodiments of the technology described herein. The process 400 may be performed by any suitable system and/or computing device and, for example, may be performed by security system 14 described with reference to FIG. 1A.

Process 400 begins at act 402, where the system executing process 400 (e.g., security system 14) receives, from a client device, a communication indicating an asserted type of the client device. The client device may be any suitable type of device and, for example, may be one of user devices 11A, 11B, and 11C described with reference to FIG. 1A. The system may receive the communication directly from the client device or indirectly, for example, via another system that received the communication first (e.g., online system 12 or 13 described with reference to FIG. 1A).

In some embodiments, the communication may assert that the client device is a mobile device or another type of device (e.g., a desktop). Additionally, or alternatively, the communication may include information about the hardware configuration of the device (e.g., information indicating the processor type, information indicating the number of processors, information about the type of memory in the device, information about any GPU in the device, information about communication hardware in the device, information about one or more chipsets in the device, etc.). Additionally, or alternatively, the communication may include information about the manufacturer of the device and/or one or more hardware components of the device. Additionally, or alternatively, the communication may include information about the version and/or generation of the device (e.g., first generation iPad, IPhone 5s, etc.). Additionally, or alternatively, the communication may identify one or more operating systems and/or application programs (and, in some embodiments, their versions) executing on the device. It should be appreciated, however, that the communication may include any other information indicative of the type of the device in addition to or instead of the above-described examples. At act 402, the system executing process 400 may process the received communication to identify the asserted device type from the communication.

Next, process 400 proceeds to acts 404 and 406, where the system executing process 400 interacts with the client device to verify the asserted device type of the client device. First, at act 404, the system provides a software program to the client device for collecting information about the client device. In some embodiments, the software program may be a JavaScript program, but may be written in any other suitable programming language(s). The software program may be provided in any suitable format.

In some embodiments, the software program may encode a computational challenge such as, for example, a serial cumulative calculation challenge, a parallel checkpoints calculation challenge, a neural network calculation challenge, and a graphics processing unit calculation challenge. Examples of these types of computational challenges are described herein.

In some embodiments, at act 404, the security system may transmit to the client device one or more input values to provide as inputs to the computational challenge when performing it and/or one or more parameters for configuring the computational challenge. Examples of such input values and parameters are described herein.

In some embodiments, the software program may be configured to measure an amount of time taken by the client device to perform the computational challenge. In some embodiments, the software may be configured to transmit to the security system information indicating how long it took the client device to perform the computational challenge. Additionally, or alternatively, in some embodiments, the software may be configured to transmit to the security system information indicating a result obtained by performing the computational challenge.

Next, at act 406, the system executing process 400 receives, from the client device, the information collected by the software program provided to the client device at act 404. The system may receive the collected information directly from the client device or indirectly. In some embodiments, the received information may indicate an amount of time it took the client device to perform the computational challenge embodied in the software program sent to the client device at act 404. Additionally, or alternatively, the received information may indicate one or more results of performing the computational challenge. These results may be used to verify that the client device actually performed the computational challenge, in some embodiments. The received information may be in any suitable format.

Next, at act 408, the system executing process 400 determines whether the information received at act 406 is consistent with the asserted device type of the client device. This may be done in any suitable way. For example, the information received from the client device indicating the amount of time taken by the client device to perform the computational challenge may be used to determine whether the amount of time it took the client device to perform the computational challenge is consistent with how long it takes client devices having the asserted type to perform the same task. To this end, the security system may access information indicating expected execution times associated with the computational challenge for a population of devices having the asserted type, and compare the measured amount of time with the accessed information to determine if the device type is being spoofed.

In some embodiments, the information indicating expected execution times associated with the computational challenge may include a range of expected execution times and the system may determine whether the amount of time taken by the client device to perform the computational challenge falls within the range. When it is determined that the amount of time taken by the client device to perform the computational challenge does not fall within the range, the security system may determine that the device type is being spoofed. On the other hand, when it is determined that the amount of time taken by the client device to perform the computational challenge falls within the range, the security system may determine that the device type is not being spoofed.

In some embodiments, the information indicating expected execution times associated with the computational challenge may include statistics of execution times and the system may determine whether the amount of time taken by the client device to perform the computational challenge deviates from the statistics. This may be done in any suitable way such as through the use of statistical hypothesis tests, determining whether the amount of time taken is at least a threshold number of standard deviations from the sample mean of execution times, and the like. When it is determined that the amount of time taken by the client device to perform the computational challenge deviates from the statistics, the security system may determine that the device type is being spoofed. On the other hand, when it is determined that the amount of time taken by the client device to perform the computational challenge does not deviate from the statistics, the security system may determine that the device type is not being spoofed.

It should be appreciated that, although in some embodiments, the amount of time taken by the client device to perform a computational challenge may be provided by the software program executing on the device, in other embodiments, the security system may determine, itself, the amount of time taken to perform the computational challenge. For example, the security system may measure the amount of time that elapses between the time when the software program embodying the computational challenge was sent to the client device (e.g., at act 404) and the time that the security system received information from the client device indicating that its execution of the computational challenge has been completed (e.g., at act 406).

In response to determining that the device type is being spoofed, the security system may take any suitable type of action including, but not limited to, denying the client device access to a resource the client device is requesting (e.g., access to a webpage, access to a service), adding information about the client device to a list of client devices to block, notifying one or more users that a communication with a spoofed device type was received. On the other hand, in response to determining that the device type is not being spoofed, the security system may grant the client device access to a resource the client device may be requesting or perform further checks in connection with the received communication from the client device (e.g., by checking whether the communication misrepresents the identity of the application program used to send the application, according to techniques described herein).

FIG. 4B is a flowchart of an illustrative process 450 performed as part of a technique for detecting device type spoofing, in accordance with some embodiments of the technology described herein. Process 450 may be performed by any suitable computing device. For example, process 450 may be performed by any of user devices 11A, 11B, and 11C, described with reference to FIG. 1A. Process 450 and process 400 may be performed complementarily. For example, a security system may interact with a client device by executing acts of process 400 and the client device may interact with the security system by executing acts of process 450. This interaction may take place in real-time so that the acts performed by the security system are performed in response to acts performed by the client device and vice versa. This is further illustrated below with reference to FIG. 5.

Process 450 begins at act 452, where the client device performing process 450 generates and sends to a server a communication asserting a device type for the client device. Next, at act 454, the client device receives, from at least one computer, directly or indirectly, a software program for collecting information about the client device. The software may include a computational challenge and one or more inputs and/or parameters for the computational challenge. In some embodiments, the at least one computer may be part of a security system (e.g., security system 14).

Next, at act 456, the client device executes the software program received at act 454. The client device may perform a computational challenge by executing the software program. Additionally, the client device may measure the amount of time it takes the device to perform the computational challenge.

Next, at act 458, the client device sends information collected by the software program to the at least one computer. The collected information may include a result of performing the computational challenge. Additionally, or alternatively, the collected information may include an indication of the amount of time it took the client device to perform the computational challenge. It should be appreciated that the client device may transmit any other suitable information to the at least one computer at act 458, such as a universally unique identifier, as aspects of the technology described herein are not limited in this respect.

Figure 5:
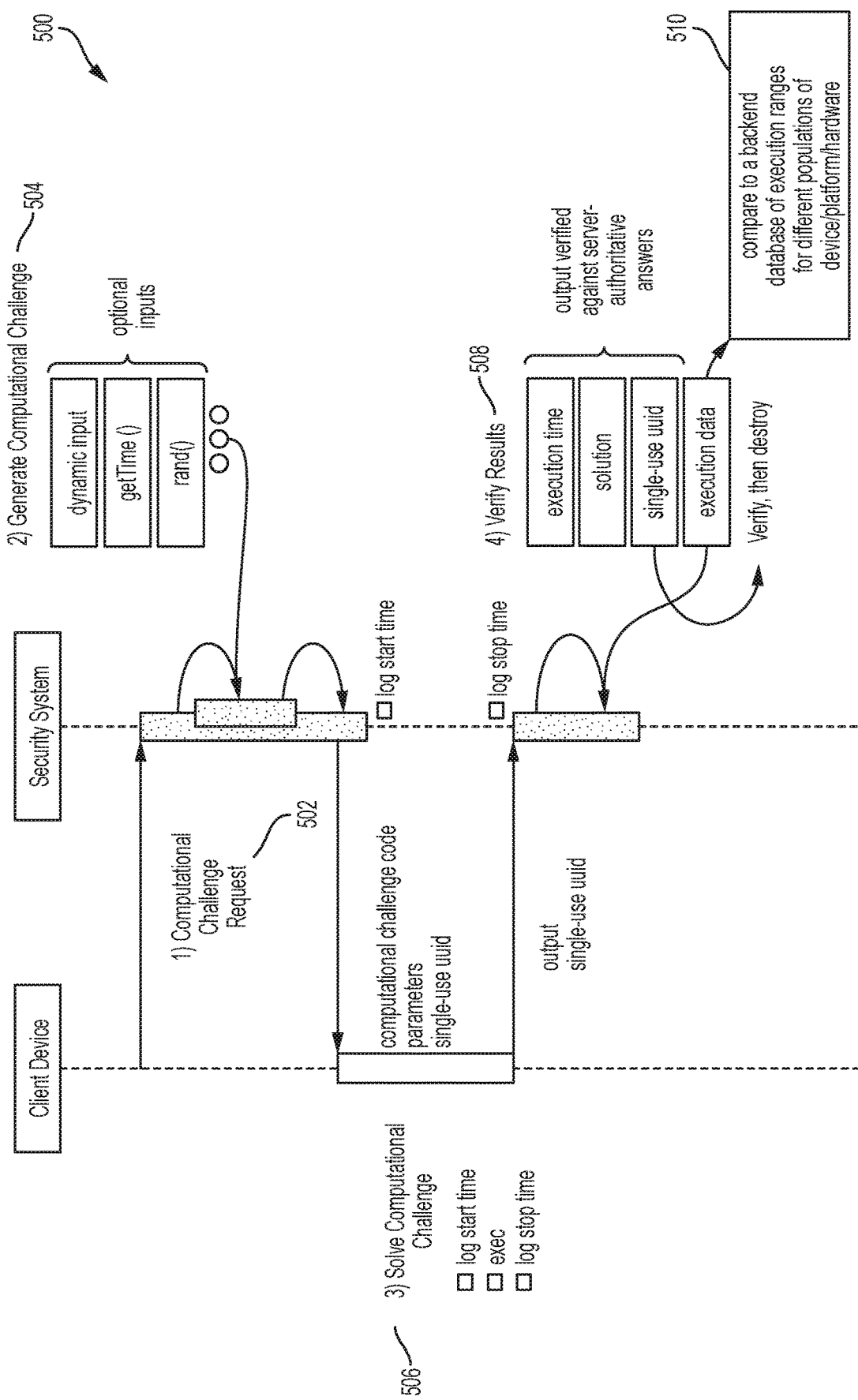
FIG. 5 is a diagram of a distributed technique for detecting device type spoofing, in accordance with some embodiments of the technology described herein.

FIG. 5 is a diagram of an illustrative distributed technique 500 for detecting device type spoofing, in accordance with some embodiments of the technology described herein. The distributed technique 500 may be performed by a client device (e.g., any one of user devices 11A, 11B, and 11C described with reference to FIG. 1A) and a security system (e.g., security system 14 described with reference to FIG. 1A).

In some embodiments, the technique begins at act 502, where the security system may receive a request for a computational challenge to be provided to the client device, which client device has asserted in a communication (e.g., an HTTP request) as being of a particular type. In some embodiments, the request for the computational challenge may be received directly from the client device. In other embodiments, the request may be received from a system that manages a resource to which the client device is requesting access. For example, the client device may request to access a webpage hosted on online system 12 (described with reference to FIG. 1A) and the online system 12 may request that the security system verify the authenticity of the request, for example, by providing a computational challenge to the client device.

In some embodiments, in response to receiving a computational challenge request, the security system may generate a computational challenge at act 504. Additionally, the security system may generate one or more optional inputs for the computational challenge including, by way of example and not limitation, one or more dynamically generated more input values, a time stamp, and a random seed. In some embodiments, the security system may also generate a one-time use universally unique identifier (UUID), which may be used to prevent hijacking or replaying of challenge tokens. The security system may then send the generated computational challenge, the UUID and optional inputs, if any, to the client device. In some embodiments, the security system may also log the time at which the computational challenge code and optional inputs (and/or other parameters) were sent to the client device.

In some embodiments, in response to receiving the computational challenge from the security system and any associated information (e.g., one or more optional inputs and a UUID), the client device may perform the computational challenge, at act 506. The client device may record the times for beginning and completing performance of the computational challenge. These times may be used to measure the amount of time taken by the client device to perform the computational challenge. After completing the computational challenge, the client device may send output to the security system. The output may include a result of performing the computational challenge and/or an indication of the amount of time it took the client device to perform the computational challenge (e.g., by sending the recorded times for beginning and completing the computational challenge and/or their difference). In some embodiments, the client device may also send the single use session UUID to the security system.

In some embodiments, in response to receiving output from the client device, the security system may record the time at which the output was received and then verify that the client device actually performed the computational challenge, at act 508. In some embodiments, the security system may check the solution to the computational challenge provided by the client device against an authoritative answer available to the security system. Additionally, or alternatively, the security system may verify that the received single-use UUID matches the UUID sent to the client device along with the computational challenge. Additionally, or alternatively, the security system may verify that the time taken by the client device to perform the computational challenge, as reported by the client device, is consistent with an estimate of that time obtained by the security system. For example, in some embodiments, the security system may compare the time reported by the client device with an estimate of the time obtained by taking the difference between the time recorded by the security system at which the computational challenge was sent to the device and the time recorded by the security system at which output from the client device was received.

In some embodiments, in response to verifying that the output provided by the client device is legitimate, the security system may determine whether the amount of time taken by the client device to perform the computational is consistent with the amount of time that it takes devices of the asserted type to perform the same computational challenge. This may be done in any of the ways described herein.

Further examples of computational challenges are described below. However, it should be appreciated that aspects of the technology described herein are not limited to the use of any of these computational challenges. In various embodiments, any one or more of these and/or other computational challenges may be used, or no computational challenge may be used at all.

A computational challenge may accept zero, one, or more challenge parameters as input. Any suitable type of data may be used as a challenge parameter, including, but not limited to, an integer, an integer array, a float, a float array, a string, a data structure, image data, etc. In some embodiments, one or more suitable encoding techniques may be applied to a given type of input data. Examples of encoding techniques include, but are not limited to, integer array encoding, base N string encoding, PNG image encoding, etc.

In some embodiments, an integer array encoding technique may be used to encode a single whole number, an array of whole numbers, or an array of UTF-8 strings. Input data of any of these types may be represented as an array. Illustrative examples of input data and corresponding encoded output are shown in the table below. In the illustrative string encoding example, a Decimal Character Reference (DCR) notation may be used when encoding UTF-8 strings.

TABLE 1

Illustrative Examples of Encoding Input Data

String encoding example
SOURCEDATA = "Source string"

TABLE 1-continued

Illustrative Examples of Encoding Input Data

OUTPUTDATA = NEW ARRAY[ ]
FOREACH(CHARACTER IN SOURCE DATA)
    OUTPUTDATA += FUNC_GET_DCR(CHARACTER)
Integer encoding example
SOURCEDATA = 1058
OUTPUTDATA = NEW ARRAY[ ] (SOURCEDATA)
Integer array encoding example
SOURCEDATA = NEW ARRAY[ ] (1058, 2500, 102, 0)
OUTPUTDATA = SOURCEDATA In some embodiments, a base N string encoding may be used, for example, to encode complex data structures. In some embodiments, base 16 string encoding and/or base 64 string encoding may be used. Alternatively, or additionally, a dynamic base N may be used, for example, where N is a random value between 16 and 64. In some embodiments, prior to performing base N encoding, one or more extra processing steps may be performed on a raw JSON string (e.g., XOR'ing with a random key that is shared between the requesting device and the server challenge generator). Such extra processing may add complexity and thereby enhance obfuscation.

In some embodiments, an image encoding technique may be used to pack data into pixels (e.g., ordered RGB triplets for a PNG image). In some embodiments, an alpha value may be set to 1.0 to create a fully transparent image, which may prevent the encoded RGB values from being displayed as visible pixels in common image viewing and editing applications.

As described herein, in some embodiments, a security system may interact with a client device that sent a communication (e.g., an HTTP request) to verify whether the device is indeed of the type indicated in the communication. In some embodiments, interacting with the client may comprise sending a software program to the client embodying one or more computational challenges. In some embodiments, the security system may select one or more of the computational challenges to send to the client device from one or more challenge types, including, but not limited to, a serial cumulative calculation challenge, a parallel checkpoints calculation challenge, a multilayer perceptron (MLP) calculation challenge, and a graphics processing unit (GPU) calculation challenge. Illustrative examples of these types of computational challenges are described below.

In some embodiments, in response to a request from a device, a variant of a selected challenge type may be returned to the device for execution. For example, a variant may be selected randomly, or in some other suitable manner (e.g., according to a fixed ordering), from a plurality of variants of that challenge type. Alternatively, or additionally, a variant may be generated dynamically as needed.

In some embodiments, a return type for the variant may be obfuscated. For example, one instance of a given challenge type may expect a numerical result represented by an integer type, while another instance of the same challenge type may expect a numerical result in base N encoded in a string type, for some suitable N. Additionally, or alternatively, JavaScript code returned to a requesting device may be obfuscated to make it more difficult for an attacker to reverse engineer the computational challenge. Various techniques for obfuscation are described in greater detail below.

In some embodiments, a security system may send a software program encoding a serial cumulative calculation challenge to a device in order to verify whether the device is of the type asserted in a communication. Performing a computational challenge of this type may comprise performing a compounding, cumulative calculation. For example, an end result may be calculated over many iterations, and the number of iterations may be dynamically controlled (e.g., using an input parameter "Num Iterations" indicating the number of iterations to perform).

In some embodiments, after the device performs the computational challenge, the amount of time taken by the device to perform the computational challenge may be determined and transmitted to a challenge verification server for analysis. For example, the challenge verification server may compare the recorded execution time against a range of expected execution times. The range of expected execution times may be obtained, for example, from one or more databases of execution ranges for different populations of device, platform, and/or hardware combinations. The challenge verification server may be part of the security system. Additionally, or alternatively, the result of the calculation in the computational challenge may be transmitted to the challenge verification server for analysis. For example, the challenge verification server may compare the result against an expected result retrieved from a database using the challenge parameters. This comparison may be used to prevent the device from avoiding performing the computational challenge by providing an incorrect result.

In some embodiments, a serial cumulative calculation challenge may be keyed by a one-time use, non-transferable universally unique identifier (UUID). This may also help to prevent hijacking or replaying of challenge tokens.

An illustrative example of a serial cumulative calculation challenge is shown in FIGS. 6A, 6B, and 6C, including illustrative input parameters, output results, and the calculation to perform as part of the challenge. For example, FIG. 6A shows illustrative input parameters of a serial cumulative calculation challenge including: (1) "Source Data," which is an integer indicating the initial value for the cumulative, compounding calculation; (2) "Num Iterations," which is an integer indicating the number of iterations of the cumulative compounding calculation to perform; and (3) "Function Name" which is the name of a function in the device execution context to execute (e.g., the name of a JavaScript function to execute in the context of a web browser application program).

FIG. 6B shows illustrative output results of a serial cumulative calculation challenge including: (1) "Start Time MS," which is an integer indicating a time, according to the device, at which the execution of the computational challenge was initiated at the device; (2) "Result Data," which is an integer indicating the result of the cumulative calculation; and (3) "End Time MS," which is an integer indicating a time, according to the device, at which the execution of the computational challenge was completed at the device. It should be appreciated that the above input and output parameters are illustrative and that a serial cumulative calculation challenge may have other input and/or output parameters (and/or parameters of a different type) in addition to or instead of the above described parameters.

FIG. 6C shows program instructions for an illustrative calculation to be performed as part of a serial cumulative calculation challenge. FIG. 6C also shows values of illustrative input parameters and program instructions for generating output results for the serial cumulative calculation challenge. As described herein, the serial cumulative calculation challenge (and any other type of computational challenge) may be embodied in a software program written in any suitable programming language(s) including, but not limited to, JavaScript.

In some embodiments, a security system may send a software program encoding a parallel checkpoints calculation challenge to a device in order to verify whether the device is of the type asserted in a communication. Performing a computational challenge of this type may comprise performing multiple calculations over multiple threads. In some instances, threading may be implemented using W3C web worker functionality.

In some embodiments, one or more results from one or more of the parallel threads may be transmitted to a challenge verification server for analysis. For example, the challenge verification server may compare the result(s) against one or more expected results retrieved from a database using the challenge parameters. In this manner, the challenge verification server may confirm that the device completed the present challenge and did not replay results recorded from a previous challenge.

Additionally, or alternatively, one or more execution times corresponding respectively to one or more of the parallel threads may be recorded and provided to the challenge verification server for analysis. As one example, the challenge verification server may compare the one or more recorded execution times against one or more ranges expected execution times. A range of expected execution times may be retrieved from a database of execution ranges for different populations of device, platform, and/or hardware combinations. As another example, the challenge verification server may use platform and device information provided by the device (e.g., in a User-Agent field in an HTTP request) and the one or more execution times to determine if the device is using hardware vs. software threads, or batched vs. sequential execution.

An illustrative example of a parallel checkpoints calculation challenge is shown in FIGS. 7A, 7B, and 7C, including illustrative input parameters, output results, and calculation to perform as part of the challenge. For example, FIG. 7A shows illustrative input parameters of a parallel checkpoints calculation challenge including: (1) "Source Data," which is an integer indicating the initial value for the parallel calculation; (2) "Num Iterations," which is an integer indicating the number of iterations of a calculation to perform in each thread; and (3) "Num Threads," which is an integer indicating the number of parallel executions to perform.

FIG. 7B shows illustrative output results of a parallel checkpoints challenge including: (1) "Start Time MS," which is an integer array indicating times, according to the device, at which each of the parallel executions was initiated at the device; (2) "Result Data," which is an integer array indicating the results of the parallel executions; and (3) "End Time MS," which is an integer array indicating times, according to the device, at which the parallel executions were completed at the device. It should be appreciated that the above input and output parameters are illustrative and that a parallel checkpoints calculation challenge may have other input and/or output parameters (and/or parameters of a different type) in addition to or instead of the above described parameters.

FIG. 7C shows program instructions to be performed as part of a parallel checkpoints challenge. FIG. 7C also shows values of illustrative input parameters and program instructions for generating output results for the parallel checkpoints calculation challenge. As described herein, the parallel checkpoints calculation challenge (and any other type of computational challenge) may be embodied in a software program written in any suitable programming language(s) including, but not limited to, JavaScript.

In some embodiments, a security system may send a software program encoding a neural network calculation challenge to a device in order to verify whether the device is of the type asserted in a communication. The neural network calculation challenged may also be termed a multilayer perceptron (MLP) calculation challenge. Performing a computational challenge of this type may include processing one or more input values using an MLP neural network to produce one or more output values. The MLP neural network may be a directed graph having one or more layers, including an input layer, at least one hidden layer, and an output layer, where each layer may have one or more nodes. Such nodes are sometimes referred to as "neurons."

In some embodiments, a neuron in an n-th layer (n>0) in an MLP neural network may receive input from one or more neurons in a previous layer. For example, a neuron in the n-th layer may receive an input from at least some (e.g., all) of the neurons in the previous layer. In some embodiments, each input may be associated with a different weight, and a total input at the neuron in the n-th layer may be computed as a weighted sum of the inputs from all of the neurons in the previous layer. It should be appreciated that one or more of the weights may be zero. An illustrative for loop for calculating a total input at a neuron is shown in Table 2 below.

TABLE 2

Illustrative for loop for determining a total input at a node of an MLP neural network

```
for(int i = 0; i < previousLayerNeurons; i ++) {
    value[neuron, layer] += (weight(i, neuron) * value[i,layer−1]);
}
value[neuron,layer] = activationFunction(value[neuron,layer]);
```

In some embodiments, an activation function may be provided that maps an input at a neuron (e.g., a weighted sum of inputs from all neurons in a previous layer) to an output at that neuron. This output may be used as an input at one or more neurons in a next layer. In this manner, one or more input values at an input layer may be fed through the MLP neural network to produce one or more output values at an output layer. In some embodiments, the same activation function may be used at all neurons in an MLP neural network. Alternatively, some neurons may have different activation functions.

In some embodiments, a computational function may be encoded into an MLP neural network. In some embodiments, the computational function may have hidden data embedded therein. The inventors have recognized and appreciated that a computational function and/or hidden data may be designed to provide verifiable proof of execution of the MLP neural network and/or one or more bounds on when the execution occurred. Additionally, or alternatively, data gathered before, during, and/or after the execution may be used to identify one or more characteristics of the device executing the MLP neural network computational challenge. Examples of such data include, but are not limited to, timing and/or state information. In some embodiments, one or more pieces of the gathered data may be used to seed one or more future rounds of the computational challenge.

In some embodiments, an exclusive OR (XOR) function may be encoded into an MLP neural network. For instance, a modified XOR truth table may be constructed by replacing each "0" value in a column of a standard XOR truth table with a random value, and likewise for each "1" value. For example, a standard XOR truth table is shown in Table 3 below.

TABLE 3

Illustrative example of XOR truth table

0 × 0 = 0
0 × 1 = 1
1 × 0 = 1
1 × 1 = 0

In this example, six values may be chosen, at random, to replace the "0" and "1" values in the truth table, thereby randomizing 0 and 1 for each column of values. For instance, the randomly chosen values may be 0.6, 0.7, 1.2, 1.4, 1.3, and 2.9, resulting in the illustrative modified XOR truth table shown in Table 4.

TABLE 4

Illustrative example of modified XOR truth table 0.6 × 1.2 = 1.3
0.6 × 1.4 = 2.9
0.7 × 1.2 = 2.9
0.7 × 1.4 = 1.3

In some embodiments, an MLP neural network may be trained to encode a modified XOR truth table such as the illustrative table shown in Table 4. For example, a value may be chosen randomly (e.g., 1.2) and used as a parameter of the MLP neural network. Thus, the MLP neural network may encode two rows in the modified XOR truth table (e.g., the first and third rows). Four other values may be also chosen randomly, say, 0.6, 0.7, 1.3, and 2.9. Appropriate weights may then be determined through training so that in response to the input of 0.6 the MLP neural network may output 1.3, and in response to the input of 0.7 the MLP neural network may output 2.9, corresponding, respectively, to the first and third rows of the illustrative modified XOR truth table shown in Table 4. In some embodiments, such training may produce a different combination of weights for each quadruple of values (e.g., <0.6, 0.7, 1.3, 2.9>). Therefore, there may be as many different combinations of weights as there are different quadruples.

In some embodiments, an MLP calculation challenge may include asking an operator (e.g., a legitimate user or an attacker) to execute an MLP neural network for a particular input. The operator may be given a dataset corresponding to the MLP neural network, where the dataset may include weights that have been trained to encode a computational function and/or some hidden data. For example, in response to receiving a request from a device, one or more values may be chosen randomly as discussed above to obtain a modified XOR function to be encoded into an MLP neural network. The randomly chosen value(s) may include an input value (e.g., 0.6 or 0.7 in the above example) to be input to the MLP neural network. The dataset representing the MLP neural network, along with the input value, may be returned to the device. The device may be expected to perform the MLP neural network calculation on the input value and submit an output value to be verified.

Alternatively, an input value may be received from the device and may be transformed in some suitable manner (e.g., XOR'ing with a randomly chosen value), and the transformed value may be used to train MLP weights and may be returned to the device to be fed through the MLP neural network.

The inventors have recognized and appreciated that, if an input value is randomized, it may be difficult for the operator to guess whether the input value corresponds to "0" or "1." For instance, with reference to the above-described example, the operator may see that the input value is 0.6, but may not know whether 0.6 corresponds to "0" or "1." Similarly, if an output value is randomized, it may be difficult for the operator to guess whether the output value corresponds to "0" or "1." For instance, with reference to the above-described example, the operator may see, after executing the MLP neural network, that the output value is 1.3, but may not know whether 1.3 corresponds to "0" or "1."

The inventors have further recognized and appreciated that it may be difficult for an operator to determine which computational function and/or hidden data have been encoded into an MLP neural network, even if the operator is able to feed different inputs into the MLP neural network and observe the corresponding outputs. For instance, in some embodiments, executing an MLP neural network on different inputs may lead to different outputs with no clear correspondence between the inputs and respective outputs. The operator may not even know which input is in the domain of an encoded computation function. For instance, with reference to the above-described example, the domain of the encoded XOR function has only two values, namely, 0.6 and 0.7. Even if an operator were given the input 0.6 in a computational challenge, it may be difficult for the operator to guess another value in the domain, because the values in the domain are independently chosen. For instance, the operator may choose a value randomly and pass that value through the MLP neural network, but the likelihood of the operator choosing a value in the domain (e.g., 0.7) may be small.

Although a modified XOR truth table is described above for just one bit, it should be appreciated that the techniques described herein may be extended to a modified XOR for multiple bits (e.g., 2 bits, 4 bits, 8 bits, 16 bits, 32 bits, 64 bits, 128 bits, 256 bits, etc.). For instance, an XOR operation may be performed independently on each bit, with independently chosen random values and separately trained MLP neural networks. With reference to the above example, 128×6=768 random values may be generated for 128-bit XOR, as six random values may be generated for each bit. There may be no correlation from one bit of the XOR to another, so that an attacker may not be able to gain any advantage by analyzing multiple bits jointly. However, it should be appreciated that aspects of the technology described herein are not limited to encoding an XOR function into an MLP neural network, as in some embodiments one or more other types of functions may be encoded into an MLP neural network in addition to, or instead of, an XOR function.

In some embodiments, encoding a 128-bit XOR function into an MLP neural network may include the following acts:
1. 2×128=256 random values may be selected, with two values for each bit in an input to the 128-bit XOR function (e.g., 0.6 and 0.7 in the above example).
   All 256 values may be used for MLP neural network training.
   Only 128 values will be returned to an operator for use as an input (e.g., 0.6 at one of the 128 bits).
2. 2×128=256 random values may be selected, with two values for each bit in a parameter to the 128-bit XOR function (e.g., 1.2 and 1.4 in the above example)
   All 256 values may be used for MLP neural network training.
   Only 128 of these values may be embedded within the MLP neural network (e.g., the XOR function may be curried with 1.2 as a parameter at one of the 128 bits).
3. 2×128=256 random values may be selected, with two values for each bit in an output of the 128-bit XOR function (e.g., 1.3 and 2.9 in the above example).
   All 256 values may be used for MLP neural network training.
   Only 128 values may be visible to an operator as an output (e.g., 1.3 at one of the 128 bits).
4. An MLP dataset may be generated, including the following values:
   One hidden layer of two values for each bit of the 128-bit XOR function, thus 256 values in total.
   Two weights between each bit in the 128-bit input value and the two values in the hidden layer for that bit, thus 256 weights in total.
   Two weights between each bit in the 128-bit hidden value and the two values in the hidden layer for that bit, thus 256 weights in total.
   Two weights between the two values in the hidden layer for each bit of the 128-bit XOR function and the corresponding bit in the 128-bit output value, thus 256 weights in total.

Accordingly, a total of (7×256=1,792) values may be generated for a 128-bit XOR function, with 128 values being visible as an input value and 128 values being visible as an output value. There may be 1,280 values embedded in the MLP neural network, and 256 values may be discarded after training. The discarded values may not be (ever) visible to an operator.

In some embodiments, the MLP neural network and the input value to use as input to the MLP neural network may be provided to the device separately. For instance, software code may be generated dynamically in response to receiving a communication (e.g., an HTTP or other type of request) from the device, and may be returned to the device. The input value may be encoded into the dynamically generated software code (e.g., as an array). Alternatively, the input value may be accessible by the dynamically generated software code, rather than being encoded therein.

In some embodiments, an input value may be randomly or pseudo-randomly drawn from a sufficiently large space so that it may be unlikely to draw the same value twice. This may provide a unique computational challenge in response to every request. In some embodiments, an input value may be a session identifier associated with a request from a device. In some embodiments, an input value may be associated with a user, device, network connection, etc. For example, the input value may be an email address, phone number, device characteristic, location, etc. Other types of input values may also be suitable, as aspects of the present disclosure are not limited to the use of any particular type of input value.

In some embodiments, the dynamically generated software code may be configured to cause the device to download a MLP neural network dataset generated based on the input value. The MLP neural network dataset may be generated when the device attempts to download the MLP neural network dataset. In such an embodiment, the input value that was sent to the device may be stored in association with a session identifier or some other suitable reference. The dynamically generated software code may be configured to cause the device to submit the session identifier or other reference when attempting to download the MLP neural network dataset from a server, and the server may use the session identifier or other reference to retrieve the input value and use the input value to generate the MLP neural network dataset.

In some embodiments, a timestamp may be embedded into the MLP neural network dataset according to:

Result=([Input Value]XOR[Timestamp])XOR[Hidden Value]; or

Result=[Input Value]XOR([Timestamp]XOR[Hidden Value]), or in any other suitable way.

Proper execution may be verified by checking a result received from the device against an expected result from the hidden value. Once verified, the timestamp may be extracted.

In some embodiments, the timestamp may correspond to a time at which the software code for requesting the MLP dataset is executed by the device. Alternatively, or additionally, the time between the download of the software code and the download of the MLP dataset may be encoded.

In alternative embodiments, the MLP neural network dataset may be generated when the software code is generated in response to receiving a communication from the device, and may be stored in association with a session identifier or some other suitable reference. The dynamically generated software code may be configured to cause the device to submit the session identifier or other reference when attempting to download the MLP neural network dataset from a server, and the server may use the session identifier or other reference to retrieve the MLP neural network dataset.

In some embodiments, the software code returned to the device may include JavaScript code. However, it should be appreciated that aspects of the technology described herein are not limited to the use of any particular programming language. In some embodiments, the device may perform the MLP neural network calculation by executing returned JavaScript code, and/or by generating a code object configured to perform the calculation.

In some embodiments, different MLP neural network datasets (e.g., different data structures, different software code, etc.) may be made available for download from time to time, so that a previously downloaded MLP neural network dataset may become stale after some period of time (e.g., one minute, two minutes, three minutes, four minutes, five minutes, . . . , 30 minutes, . . . ) elapses. Thus, a device must execute returned software code to download a fresh MLP neural network dataset for each computational challenge, which may make it more difficult for a malicious entity to reverse engineer the encoded computational function and/or hidden data.

In some embodiments, the MLP neural network dataset may be encoded into an image file, such as a PNG file. The inventors have recognized and appreciated that encoding an MLP neural network dataset into an image file may provide improved obfuscation of the computational challenge. Furthermore, as discussed below, the inventors have recognized and appreciated various advantages of using a GPU to perform a computational challenge. In some devices, only a GPU may be capable of loading an image into the volatile memory of the device. Thus, encoding an MLP neural network dataset into an image file may ensure that a GPU, not a CPU, is used to perform a computational challenge. However, it should be appreciated that aspects of the technology described herein are not limited to encoding an MLP neural network dataset into an image file, as other types of data structures and/or formats may also be used.

In some embodiments, techniques are provided for speeding up the generation of the MLP neural network dataset. For example, rather than generating a specific MLP neural network dataset in response to receiving a request from a device, data modules may be generated during an offline stage. In response to receiving a request from a device during an online stage, one or more of the pre-generated data modules (e.g., 32 modules, 64 modules, 128 modules, etc.) may be selected (e.g., randomly). The selected data modules may be assembled into an MLP neural network dataset to be returned to the device. For instance, each data module may correspond to a modified XOR on one-bit values (e.g., as in the example described above). However, that is not required, as in some embodiments the data modules may correspond respectively to modified XOR with different input sizes (e.g., 2 bits, 4 bits, 8 bits, 16 bits, 32 bits, 64 bits, etc.)

Moreover, it should be appreciated that aspects of the technology described herein are not limited to the number of data modules that are generated ahead of time. In some embodiments, a large number of data modules (e.g., 10,000) may be generated during an offline stage and no online generation may be performed. In some embodiments, some data modules may be generated during an offline stage, while others may be generated during an online stage.

In some embodiments, an efficient scheme may be used to encode a data module (e.g., into 4-8 bytes of data). However, it should be appreciated that aspects of the technology described herein are not limited to any particular way of encoding data modules, or any encoding at all. For instance, in some embodiments, a lazy scheme may be used to encode a data module into 32-64 bytes.

In some embodiments, 64 data modules corresponding respectively to 64 XOR nodes may be randomly selected. A 32-bit value may be selected randomly as an input value and embedded into JavaScript code along with a 32-bit timestamp. An MLP dataset may be generated by assembling portions of the 64 XOR nodes that may be used to execute the MLP neural network. For instance, MLP weights may be stored as RGB colors, JSON, etc. The MLP output may be decoded with a few comparisons for each of the 64 bits of data, which may be encoded as floating point numbers.

The inventors have recognized and appreciated that an MLP neural network obtained in this manner may be executed efficiently. For example, execution of an MLP neural network encoding a 64-bit XOR function may take only about 384 multiplications, 384 additions, and 96 comparisons.

In some embodiments, results received from a device that purportedly performed a neural network computational challenge may be verified. In some embodiments, such verification may include matching a received result against a result stored in a challenge answer database. Additionally, or alternatively, verification may include checking execution time based on current platform and/or device type information (e.g., as provided in a User Agent field in an HTTP request).

An illustrative example of a neural network computation challenge is shown in FIGS. 8A and 8B, including illustrative input parameters and output results. FIG. 8A shows illustrative input parameters of a parallel checkpoints calculation challenge including: (1) "Source Data," which is an image encoding an MLP neural network data set and a timestamp; and (2) "Initial Value," which is an integer indicating an initial value for the MLP neural network specified in the dataset.

FIG. 8B shows illustrative output results of a neural network computation challenge including: (1) "Start Time Ms," which is an integer indicating a time, according to the device executing the challenge, at which execution of the challenge was initiated at the device; (2) "Result Data," which is an integer array indicating a results of the neural network computation challenge and, for example, may be obtained by computing an XOR of the MLP initial value with the MLP result and the initial, embedded timestamp; and (3) "End Time Ms," which is an integer array indicating times, according to the device executing the challenge, at which the computation challenge was completed at the device. It should be appreciated that the above input and output parameters are illustrative and that a neural network computational challenge may have other input and/or output parameters (and/or parameters of a different type) in addition to or instead of the above-described parameters.

In some embodiments, a security system may send a software program encoding a graphics processing unit (GPU) calculation challenge to a device in order to verify whether the device is of the type asserted in a communication. The inventors have recognized and appreciated that a device's GPU (e.g., on a video card) may have more consistent performance as compared to a device's CPU. For example, the inventors have recognized and appreciated that some operating systems may have a high load variance on the CPU. Depending on the processes running in a current operating system session, a same device may return varying results from computational challenges performed by the CPU. By contrast, GPU utilization may be more stable. For example, GPU utilization may generally be independent of the number of applications or processes running in the current operating system environment, which may result in more consistent computation challenge calculation times for a given device. The inventors have recognized and appreciated that such consistency may be beneficial in providing a reliable method of device fingerprinting. For instance, different devices may include different video cards, which may result in different execution times. Such execution times may be used as components of device fingerprints.

In some embodiment, a GPU calculation challenge may use logic similar to that used in an MLP calculation challenge. For example, a WebGL pixel shader may be used to read MLP image input data and calculate an MLP result using a GPU on a video card.

Figure 9:
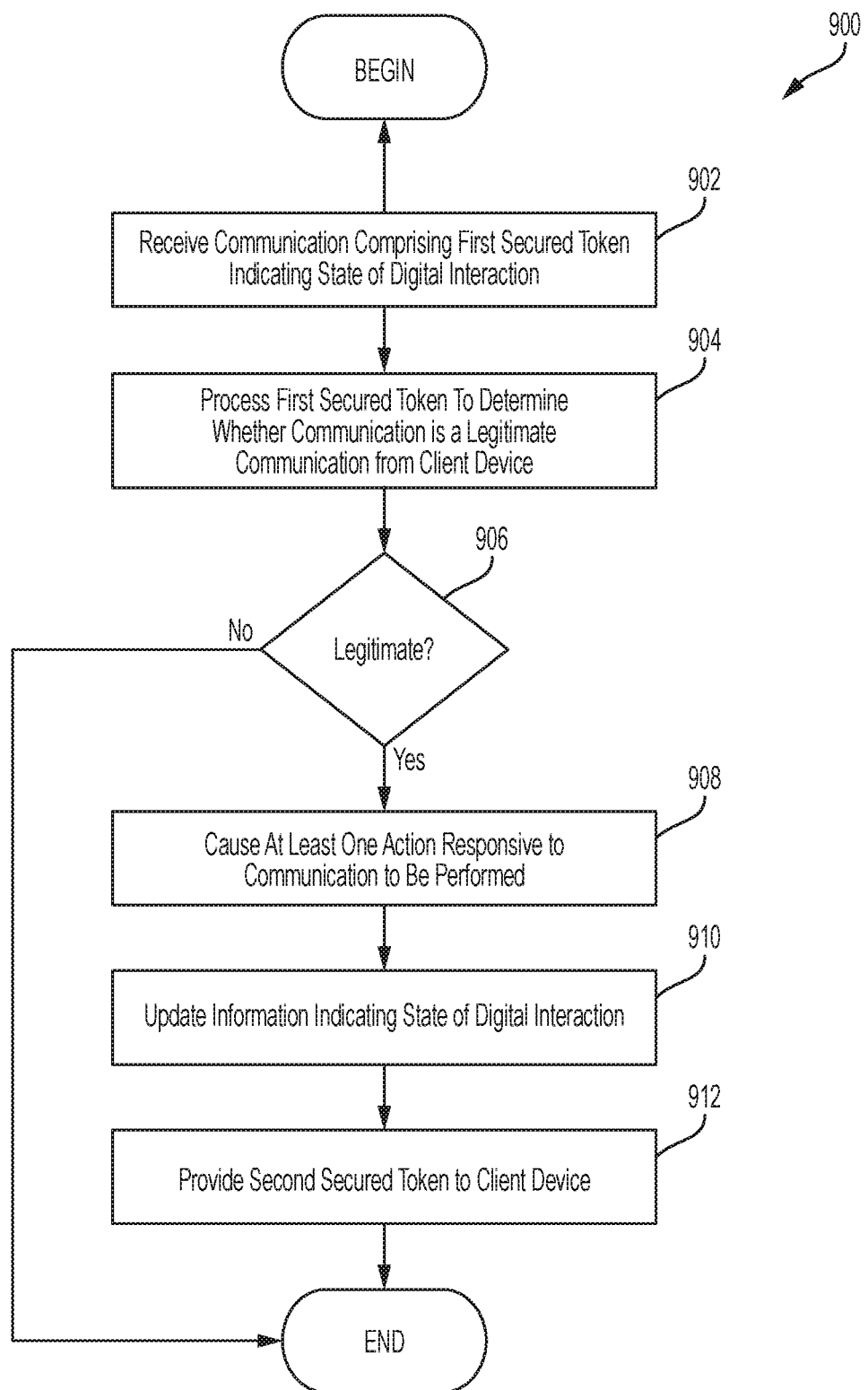
FIG. 9 is a flowchart of an illustrative process for detecting malicious exploitation of a session token, in accordance with some embodiments of the technology described herein.

FIG. 9 is a flowchart of an illustrative process 900 for detecting malicious exploitation of a session token, in accordance with some embodiments of the technology described herein. Process 900 may be performed by any suitable system. For example, process 900 may be performed by an online system comprising one or more servers or other computing devices (e.g., online system 12 described with reference to FIG. 1A). As another example, process 900 may be performed by a security system (e.g., security system 14 described with reference to FIG. 1A).

Process 900 begins at act 902 during which a communication is received comprising a first secured token indicating the state of a digital interaction between a client device (e.g., any one of user devices 11A, 11B, and 11C described with reference to FIG. 1A) and an online system (e.g., online system 12). The system executing process 900 may identify the first secured token from the communication at act 902.

In some instances, the communication may be received from the client device that is engaged in the digital interaction with the online system. In some instances, however, the communication may be received from a device of a malicious entity or from malware on the client device. Accordingly, in some instances the communication may be a legitimate communication from the client device, while in some instances, the communication may originate from a malicious entity.

In response to receiving the communication at act 902, process 900 proceeds to act 904, where the first secured token is processed in order to determine whether the communication received at act 902 is a legitimate communication from the client device. This may be done in any of the ways described herein. For example, in some embodiments, the first secured token may be processed to access therein information indicating the state of the digital interaction. The accessed information indicating the state of the digital interaction may then be compared to local information indicating the state of the digital interaction, which local information is maintained by the system executing process 900. When the state of the digital interaction, according to the information accessed in the first secured token, matches the state of the digital interaction, according to the local information maintained by the system executing process 900, the system may determine that the communication is a legitimate communication from the client device.

In some embodiments, the information indicating the state of the digital interaction may include a value indicating a number of times the information indicating the state of the digital interaction was changed during the digital interaction. For example, the information indicating the state of the digital interaction may include a sequence number whose value indicates the number of times that the information indicating the state of the digital interaction was changed. In some embodiments, the system performing process 900 may increase the sequence number by one (or any other suitable number) when (e.g., each time) the system responds to a request or other type of communication from the client device.

Additionally, or alternatively, the information indicating the state of the digital interaction may include a timestamp indicating the last time the session token was modified a type of web page through which the session token was granted, and/or any other suitable information. Any of these types of information may be used at act 904 to determine whether the communication is a legitimate communication from the client device.

In some embodiments, one or more additional checks may be used to determine whether the communication received at act 902 is a legitimate communication from the client device. For example, the system may check whether the first secured token expired. If so, then the communication may be found invalid. As another example, the first secured token may be encrypted in a way that can be decrypted only by the system (e.g., by using a secret key available only to the system). If the system is unable to decrypt the token, then the communication may be found invalid.

Next, at decision block 906, when the system determines that the communication is not a legitimate communication from the client device, any request in the communication may be denied and the process 900 completes. On the other hand, when the system determines that the communication is a legitimate communication from the client device, process 900 proceeds, via the "YES" branch, to act 908, where the system causes at least one action responsive to the communication to be performed. For example, in some embodiments, the communication may include a request for information and, at act 908, the system may provide or cause another computer to provide, to the client device, at least some information requested in the request. As another example, in some embodiments, the communication may include a request for a user-specified action to be committed (e.g., when the user clicks on a button on a bank web site to transfer money from one account to another, when the user indicates that information entered by the user is to be saved by the web site, etc.).

Next, process 900 proceeds to act 910, where the information indicating the state of the digital interaction is updated to obtain updated information indicating the state of the digital interaction. This may be done in any suitable way. For example, when the information indicating the state of the digital interaction includes a sequence number, the value of the sequence number may be changed (e.g., by incrementing or otherwise increasing the value of the sequence number). As another example, when the information indicating the state of the digital interaction includes one or more timestamps, these timestamps may be updated. As another example, when the information indicating the state of the digital interaction includes a page type, the page type may be updated to indicate the type of page via which the current request is submitted.

In some embodiments, a local copy of the updated information (or a hash thereof) indicating the state of the digital interaction may be stored by the system executing process 900 to use for determining whether a subsequent communication received by the system is a legitimate communication from the client device.

Next, process 900 proceeds to act 912, where a second secured token, containing the updated information indicating the state of the digital interaction may be obtained and provided to the client device. The second secured token may be obtained in any suitable way. For example, in some embodiments, the second secured token may be obtained by: (1) decrypting the first secured token; (2) updating, within the first secured token, information indicating the state of the digital interaction to reflect the updated information obtained at act 910; and (3) encrypting the modified token to obtain the second secured token. As another example, in some embodiments, the second secured token may be obtained by generating a new token, rather than modifying a received token, and inserting into the new token the updated information indicating the state of the digital interaction.

In the embodiment shown in FIG. 10, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 10. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 10, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for determining legitimacy of a device during a digital interaction with the device, the method comprising:
   receiving, by a computer, a first communication from the device, the first communication including a first device indicator for the device;
   determining, by the computer, a first device type based on the first device indicator;
   transmitting, by the computer, a request to the device related to a task for the device to complete;
   receiving, by the computer, a second communication from the device, the second communication including a response to the request related to the task for the device to complete;
   determining, by the computer, a characteristic of the second communication, the characteristic corresponding to an amount of time required by the device to complete the task;
   comparing, by the computer, the characteristic to a device profile related to the first device indicator, the device profile including an expected amount of time required by the device to complete the task;
   determining, by the computer, if the device is of the first device type based on the comparison between the characteristic and the device profile; and
   denying the device access to a network resource when the device is not the first device type,
   wherein the device is determined to not be the first device type when the amount of time required by the device to complete the task is less than the expected amount of time required by the device to complete the task.

2. The method of claim 1, further comprising:
   transmitting, by the computer, a second request to the device related to a second task for the device to complete;
   receiving, by the computer, a third communication from the device, the third communication including a response to the second request related to the second task for the device to complete;
   determining, by the computer, a second characteristic of the third communication, the second characteristic corresponding to an amount of time required by the device to complete the second task;
   comparing, by the computer, the second characteristic to the device profile related to the first device indicator; and
   determining, by the computer, if the device is of the first device type based on the comparison between the characteristic and the device profile and the comparison between the second characteristic and the device profile.

3. The method of claim 2, wherein the second task for the device to complete is the same as the first task for the device to complete.

4. The method of claim 2, wherein the second task for the device to complete is different than the first task for the device to complete.

5. The method of claim 1, wherein the first task is selected from the group consisting of: a computational challenge; providing a response to an additional information request; and executing a software program.

6. The method of claim 5, wherein the computational challenge is selected from the group consisting of: a serial cumulative calculation challenge; a parallel checkpoints challenge; a neural network calculation challenge; and a graphics processing unit calculation challenge.

7. The method of claim 1, wherein the network resource is a webpage.

8. A system for determining legitimacy of a device during a digital interaction with the device, the system comprising:
   a computer;
   a non-transitory computer-readable storage medium including processor-executable instructions that, when executed by the computer, cause the computer to:
   receive a first communication from the device;
   determine a first device type based on the first communication;
   transmit a request to the device related to a first task for the device to complete;

receive a second communication from the device, the second communication including a response to the request related to the first task for the device to complete;

determine an amount of time required by the device to complete the first task;

compare the amount of time to a device profile related to the first device type, the device profile including an expected amount of time required by the device to complete the first task;

determine if the device is of the first device type based on the comparison between the amount of time and the device profile; and deny the device access to a network resource when the device is not the first device type, wherein the device is determined to not be the first device type when the amount of time required by the device to complete the first task is less than the expected amount of time required by the device to complete the first task.

9. The system of claim 8, the non-transitory computer-readable storage medium further including processor-executable instructions that, when executed by the computer, cause the computer to:

transmit a second request to the device related to a second task for the device to complete;

receive a third communication from the device, the third communication including a response to the second request related to the second task for the device to complete;

determine a second amount of time required by the device to complete the second task;

compare the second amount of time to the device profile; and determine if the device is of the first device type based on the comparison between the amount of time and the device profile and the comparison between the second amount of time and the device profile.

10. The system of claim 9, wherein the second task for the device to complete is the same as the first task for the device to complete.

11. The system of claim 9, wherein the second task for the device to complete is different than the first task for the device to complete.

12. The system of claim 8, wherein the first task is selected from the group consisting of: a computational challenge; providing a response to an additional information request; and executing a software program.

13. The system of claim 12, wherein the computational challenge is selected from the group consisting of: a serial cumulative calculation challenge; a parallel checkpoints challenge; a neural network calculation challenge; and a graphics processing unit calculation challenge.

14. The system of claim 8, wherein the network resource is a webpage.

15. A non-transitory computer-readable storage medium including processor-executable instructions that, when executed by a computer, cause the computer to:

receive a first communication from the device, the first communication including a first device indicator for the device;

determine a first device type based on the first device indicator;

transmit a request to the device related to a first task for the device to complete;

receive a second communication from the device, the second communication including a response to the request related to the first task for the device to complete;

determine an amount of time required by the device to complete the first task;

compare the amount of time to a device profile related to the first device indicator, the device profile including an expected amount of time required by the device to complete the first task;

determine if the device is of the first device type based on the comparison between the amount of time and the device profile; and deny the device access to a network resource when the device is not the first device type, wherein the device is determined to not be the first device type when the amount of time required by the device to complete the first task is less than the expected amount of time required by the device to complete the first task.

16. The non-transitory computer-readable storage medium of claim 15, further including processor-executable instructions that, when executed by the computer, cause the computer to:

transmit a second request to the device related to a second task for the device to complete;

receive a third communication from the device, the third communication including a response to the second request related to the second task for the device to complete;

determine a second an amount of time required by the device to complete the second task;

compare the second amount of time to the device profile related to the first device indicator; and determine if the device is of the first device type based on the comparison between the amount of time and the device profile and the comparison between the second amount of time and the device profile.

17. The non-transitory computer-readable storage medium of claim 16, wherein the second task for the device to complete is the same as the first task for the device to complete.

18. The non-transitory computer-readable storage medium of claim 15, wherein the first task is selected from the group consisting of: a computational challenge; providing a response to an additional information request; and executing a software program.

* * * * *